United States Patent
Mullins et al.

(10) Patent No.: US 9,619,712 B2
(45) Date of Patent: Apr. 11, 2017

(54) THREAT IDENTIFICATION SYSTEM

(71) Applicant: DAQRI, LLC, Los Angeles, CA (US)

(72) Inventors: Brian Mullins, Altadena, CA (US); Matthew Kammerait, Studio City, CA (US)

(73) Assignee: DAQRI, LLC, Los Angeles, CA (US)

( * ) Notice: Subject to any disclaimer, the term of this patent is extended or adjusted under 35 U.S.C. 154(b) by 0 days.

(21) Appl. No.: 15/158,498

(22) Filed: May 18, 2016

(65) Prior Publication Data
US 2016/0342840 A1 Nov. 24, 2016

Related U.S. Application Data

(60) Provisional application No. 62/163,046, filed on May 18, 2015.

(51) Int. Cl.
| | | |
|---|---|---|
| G09G 5/00 | (2006.01) |
| G06K 9/00 | (2006.01) |
| G08B 21/18 | (2006.01) |
| G06T 19/00 | (2011.01) |
| G06F 3/14 | (2006.01) |
| G02B 27/01 | (2006.01) |
| G06F 3/01 | (2006.01) |

(52) U.S. Cl.
CPC ..... *G06K 9/00671* (2013.01); *G02B 27/0172* (2013.01); *G06F 3/14* (2013.01); *G06T 19/00* (2013.01); *G06T 19/006* (2013.01); *G08B 21/182* (2013.01); *G02B 27/017* (2013.01); *G02B 2027/0138* (2013.01); *G02B 2027/0141* (2013.01); *G06F 3/011* (2013.01); *G06F 3/012* (2013.01)

(58) Field of Classification Search
CPC ....... G06F 3/011; G06F 3/012; G02B 27/017; G06T 19/006; G06T 19/00
See application file for complete search history.

(56) References Cited

U.S. PATENT DOCUMENTS

| | | | | |
|---|---|---|---|---|
| 2003/0210228 A1* | 11/2003 | Ebersole | ............. | G02B 27/017 345/157 |
| 2004/0008253 A1* | 1/2004 | Monroe | ........... | G08B 13/19641 348/143 |
| 2013/0116922 A1* | 5/2013 | Cai | ...................... | G01C 21/206 701/515 |
| 2013/0335301 A1* | 12/2013 | Wong | ................. | G02B 27/0093 345/8 |

OTHER PUBLICATIONS

"International Application Serial No. PCT/US2016/033149, International Search Report mailed Aug. 16, 2016", 2 pgs.
"International Application Serial No. PCT/US2016/033149, Written Opinion mailed Aug. 16, 2016", 8 pgs.

* cited by examiner

*Primary Examiner* — James A Thompson
*Assistant Examiner* — Tapas Mazumder
(74) *Attorney, Agent, or Firm* — Schwegman Lundberg & Woessner, P.A.

(57) ABSTRACT

A head mounted device (HMD) includes a transparent display, sensors to generate sensor data, and a processor. The processor identifies a threat condition based on a threat pattern and the sensor data, and generates a warning notification in response to the identified threat condition. The threat pattern includes preconfigured thresholds for the sensor data. The HMD displays AR content comprising the warning notification in the transparent display.

18 Claims, 14 Drawing Sheets

THREAT IDENTIFICATION SYSTEM

REFERENCE TO RELATED APPLICATION

This application claims the benefit of priority of U.S. Provisional Application No. 62/163,046 filed May 18, 2015, which is herein incorporated by reference in its entirety.

TECHNICAL FIELD

The subject matter disclosed herein generally relates to an augmented reality device. Specifically, the present disclosure addresses systems and methods for identifying a threat using a head mounted device.

BACKGROUND

An augmented reality (AR) device can be used to generate and display data in addition to an image captured with the AR device. For example, AR is a live, direct, or indirect view of a physical, real-world environment whose elements are augmented by computer-generated sensory input such as sound, video, graphics or Global Positioning System (GPS) data. With the help of advanced AR technology (e.g., adding computer vision and object recognition) the information about the surrounding real world of the user becomes interactive. Device-generated (e.g., artificial) information about the environment and its objects can be overlaid on the real world.

BRIEF DESCRIPTION OF THE DRAWINGS

Some embodiments are illustrated by way of example and not limitation in the figures of the accompanying drawings.

DETAILED DESCRIPTION

Figure 1:
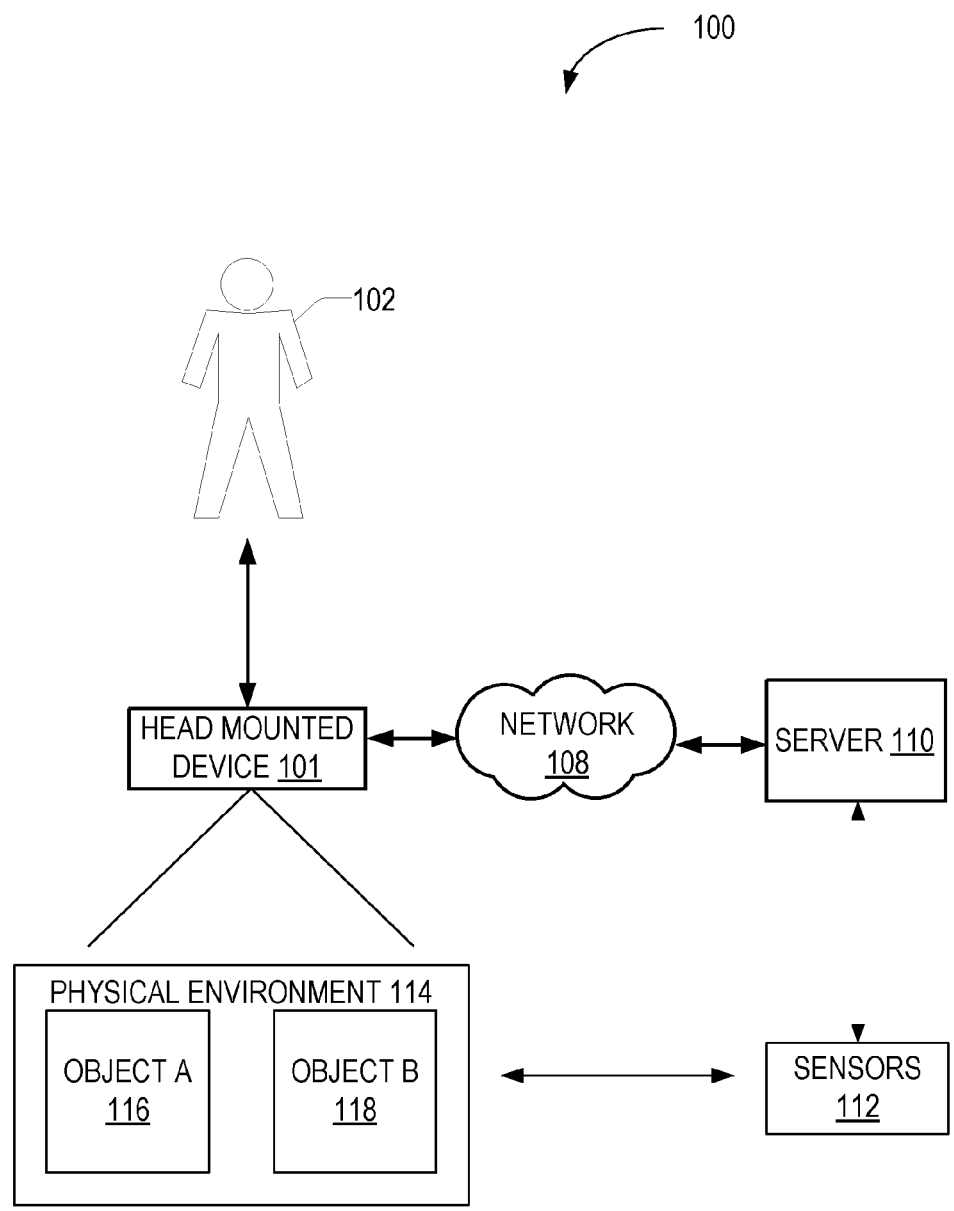
FIG. 1 is a block diagram illustrating an example of a network suitable for a head mounted device system, according to some example embodiments.

Example methods and systems are directed to a threat identification system for an augmented reality device. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one example embodiment, a HMD includes a helmet, a transparent display, sensors, an augmented reality (AR) application, and a threat application implemented in one or more processors. The transparent display includes lenses that are disposed in front of user's eyes (while wearing the helmet or head mounted device) to display AR content (e.g., virtual objects). The AR application renders the AR content for display in the transparent display of the HMD. The sensors generate sensor data. The sensor data may include HMD-based sensor data related the HMD (e.g., a geographic location of the HMD, an orientation and position of the HMD), and ambient-based sensor data related to an ambient environment of the HMD (e.g., ambient temperature, ambient humidity, ambient light, ambient pressure). In one example embodiment, the sensors include a first set of sensors to generate the HMD-based sensor data, and a second set of sensors to generate the ambient-based sensor data. Examples of the first set of sensors include a camera, GPS sensor, an Inertial Measurement Unit (IMU). Examples of the second set of sensors include an audio sensor, a barometer, a humidity sensor, and an ambient light sensor.

The threat application identifies a threat based on a threat pattern and the sensor data. The threat pattern includes, for example, preconfigured thresholds for the sensor data or a series of user activities and corresponding sensor data resulting from the user activities. The threat application generates a warning notification in response to detecting the threat. The threat application compares the sensor data with the threat pattern to determine a threat. The AR application causes a display of the AR content comprising the warning notification in the transparent display. The warning notification may include a visual notification in the transparent display to bring the attention of the user to the imminent threat. For example, the transparent display may display a layer of virtual flashing lights on the physical objects causing the threat (e.g., a physical motor may be flashing red to indicate that the physical motor is overheating) or a virtual arrow showing a direction of the imminent threat.

The threat application can either receive the threat pattern from a server or generate the threat pattern locally on the HMD. The server may generate the threat pattern based on preconfigured thresholds for the sensor data. A user may input the preconfigured thresholds based on determined safe levels for the corresponding sensors. In another example embodiment, the determined safe level for a sensor may be associated with a step in a series of user activities. For example, the user may specify that the maximum temperature for a component may be $t1_{max}$ after the user operates switch S1, then turns on valve V1. The maximum temperature for the same component may be $t2_{max}$ after the user turns on valve V2 after the user turns on valve V1.

The threat application may identify one of the sensor data exceeding one of the preconfigured thresholds specified in the threat pattern (received from the server or generated locally at the HMD), and generate correction information based on the identified sensor data exceeding one of the preconfigured thresholds. For example, the correction information may include instructions for the user to remedy the threat by operating a physical object identified by the HMD and within reach of the user (e.g., a layer of virtual arrows is displayed on top of a physical valve in the transparent display to show the user the direction in which to turn off a valve causing or associated with the threat). In another example, the correction information may include instructions for the user to minimize exposure to the threat (e.g., a layer of a virtual path of an evacuation route is displayed on top of the physical ground in the transparent display to guide the user to an exit). In another example, the AR content includes instructions (e.g., text) to the user of the HMD and a three-dimensional model to visualize the instructions (e.g., animated virtual character pointing to an exit path).

In another example embodiment, the threat application accesses historical sensor data corresponding to user tasks provided by the AR application. Examples of user tasks include operating a particular machine, fixing a component, or maintaining a machine. For example, the AR application provides step by step instructions to the user for operating a machine. Each step, the user tasks are recorded along with the corresponding sensor data resulting from each user task. For example, the AR application may display a virtual arrow above a valve of a machine to indicate the direction in which to rotate the valve. The AR application determines that the user has turned the valve by detecting a change in the position of the valve (either by using sensors connected to the valve or using image recognition to visually determine a different position of a valve). The threat application measures sensor data in response to the user turning the valve. For example, the threat application measures a pressure in a conduit connected to the valve. After the valve has turned, the AR application displays the next step, such as a virtual button corresponding to a physical button of the machine, and instructs the user to press on the virtual button. Once the AR application determines the button has been pressed, the threat application measures sensor data in response to the pressed button. For example, the threat application measures a temperature of a component associated with the button. Therefore, the historical sensor data includes historical sensor data associated with each step of a user task. For example, the pressure of conduit C may change from pressure p1 to pressure p2 in response to the user turning the valve. Similarly, the temperature of component C may change from temperature t1 to temperature t2 in response to the user pushing button B.

The threat application may use the historical sensor data to identify user actions that resulted in a negative outcome. A negative outcome may be defined based on preconfigured parameters for the sensor data. The negative outcome may be identified when one of the sensor data exceeds a predefined safety threshold. For example, the negative outcome is identified when a pressure exceeds a predefined safety threshold pressure for the valve. The threat application then identify the cause of the negative outcome (e.g., user turned the valve).

In one example embodiment, the threat application filters historical sensor data with negative outcomes from the historical sensor data to identify user actions that have triggered the negative outcome. For example, the threat application may identify user activities that have contributed to negative outcomes to generate the threat pattern.

A server may collect sensor data from several HMDs and generate a threat pattern associated with a user activity (e.g., fixing an engine) based on the sensor data from the HMDs. For example, the threat pattern may be based on preconfigured parameters for the HMD-based sensor data and the ambient-based sensor data of HMDs. The server may further identify a task of the AR application, a physical object corresponding to the task, historical HMD-based sensor data related to the task and the physical object, historical ambient-based sensor data related to the task and the physical object, historical user activities related to the task, and an outcome of the historical user activities. The server may further generate the threat pattern based on a negative outcome of the historical user activities, the negative outcome determined in response to the historical HMD-based sensor data or historical ambient-based sensor data exceeding a predefined threshold. In one example, the threat pattern comprises a series of user activities with respect to the physical object, a series of HMD-based sensor data corresponding to the series of user activities, and a series of historical ambient-based sensor data corresponding to the series of user activities.

In another example embodiment, the server or the HMD may receive ambient-based sensor data from a third set of sensors external to the HMD. For example, the third set of sensors may be placed in a room (e.g., camera and temperature sensor in a room). Therefore, the threat pattern may also be based on a series of historical ambient-based sensor data from the third set of sensors.

The AR application of the HMD may determine a travel direction of the HMD based at least one of the sensors (of the HMD or external to the HMD). The AR application may determine that the travel direction is outside a field of view of a user of the HMD (e.g., the user is looking to the side while walking straight). The AR application may identify a moving physical object outside a field of view of the user of the HMD (e.g., a forklift is approaching) and determine a trajectory of the moving physical object based on a travel path of the moving physical object (e.g., forklift is about to go in front of the user of the HMD). The AR application may then determine that the trajectory of the moving physical object intersects the travel direction of the HMD at an estimated intersection located within a threshold distance of the HMD (e.g., user of the HMD may crash into the forklift in ten feet), and generate the warning notification based on the estimated intersection.

In another example embodiment, the AR application of the HMD identifies a physical object in an image captured with a camera of the HMD and retrieves a three-dimensional model of a virtual object based on the identified object in the image. The AR application then renders the three-dimensional model of the virtual object in the transparent display. The user perceives the virtual object as an overlay on the real world physical object.

The display of the HMD may be retracted inside the helmet and extended outside the helmet to allow a user to view the display. The position of the display may be adjusted based on an eye level of the user. For example, the display may be positioned in a line of sight of the user of the HMD. The display may include a display lens capable of displaying AR content. The helmet may include a computing device, such as a hardware processor, with an AR application that allows the user wearing the helmet to experience information, such as in the form of a virtual object such as a three-dimensional (3D) virtual object overlaid on an image or a view of a physical object captured with a camera in the helmet. The helmet may include optical sensors. The physical object may include a visual reference (e.g., a recognized image, pattern, or object, or unknown objects) that the AR application can identify using predefined objects or machine vision. A visualization of the additional information (also referred to as AR content), such as the 3D virtual object overlaid or engaged with a view or an image of the physical object, is generated in the display lens of the helmet. The display lens may be transparent to allow the user see through the display lens. The display lens may be part of a visor or face shield of the helmet or may operate independently from the visor of the helmet. The 3D virtual object may be selected based on the recognized visual reference or captured image of the physical object. A rendering of the visualization of the 3D virtual object may be based on a position of the display relative to the visual reference. Other AR applications allow the user to experience visualization of the additional information overlaid on top of a view or an image of any object in the real physical world. The virtual object may include a 3D virtual object and/or a two-dimensional (2D) virtual object. For example, the 3D virtual object may include a 3D view of an engine part or an animation. The 2D virtual object may include a 2D view of a dialog box, menu, or written information such as statistics information for properties or physical characteristics of the corresponding physical object (e.g., temperature, mass, velocity, tension, stress). The AR content (e.g., image of the virtual object, virtual menu) may be rendered at the helmet or at a server in communication with the helmet. In one example embodiment, the user of the helmet may navigate the AR content using audio and visual inputs captured at the helmet or other inputs from other devices, such as a wearable device. For example, the display lenses may extend or retract based on a voice command of the user, a gesture of the user, a position of a watch in communication with the helmet.

In another example embodiment, a non-transitory machine-readable storage device may store a set of instructions that, when executed by at least one processor, causes the at least one processor to perform the method operations discussed within the present disclosure.

FIG. 1 is a network diagram illustrating a network environment 100 suitable for operating an AR application of a HMD with display lenses, according to some example embodiments. The network environment 100 includes a HMD 101 and a server 110, communicatively coupled to each other via a network 108. The HMD 101 and the server 110 may each be implemented in a computer system, in whole or in part, as described below with respect to FIG. 13.

The server 110 may be part of a network-based system. For example, the network-based system may be or include a cloud-based server system that provides AR content (e.g., audio or visual instructions on how to operate a tool, information about an imminent or potential threat, instructions on how to remedy the threat or minimize exposure to the threat, visualization of the threat, augmented information including 3D models of virtual objects related to physical objects in images captured by the HMD 101) to the HMD 101.

The HMD 101 may include a helmet or other head mounted device that a user 102 may wear to view the AR content related to captured images of several physical objects (e.g., object A 116, object B 118) in a real world physical environment 114. In one example embodiment, the HMD 101 includes a computing device with a camera and a display (e.g., smart glasses, smart helmet, smart visor, smart face shield). The computing device may be removably mounted to the head of the user 102. In one example, the display may be a screen that displays what is captured with a camera of the HMD 101. In another example, the display of the HMD 101 may include a transparent display or see-through display, such as in the visor or face shield of a helmet, or a display lens distinct from the visor or face shield of the helmet.

The user 102 may be a user of an AR application in the HMD 101 and at the server 110. The user 102 may be a human user (e.g., a human being), a machine user (e.g., a computer configured by a software program to interact with the HMD 101), or any suitable combination thereof (e.g., a human assisted by a machine or a machine supervised by a human). The user 102 is not part of the network environment 100, but is associated with the HMD 101.

In one example embodiment, the AR application determines the AR content to be rendered and displayed in the display of the HMD 101 based on sensor data related to the HMD 101, sensor data related to the user 102, sensor data related to physical objects 116, 118, and sensor data related to an ambient environment of the HMD 101. The sensor data related to the HMD 101 may also be referred to as HMD-based sensor data. The sensor data related to the user 102 may also be referred to as user-based sensor data. The sensor data related to the physical objects 116, 118 in the physical environment 114 that the HMD 101 is located may also be referred to as physical object-based sensor data. The sensor data related to the ambient environment of the HMD 101 may be also referred to as ambient-based sensor data. The HMD-based sensor data may include a geographic location, a position, an orientation of the HMD 101 by using, for example, a GPS sensor and an IMU sensor in the HMD 101. The user-based sensor data may include a heart rate, a blood pressure, brain activity, and biometric data related to the user 102 by using, for example, a heart rate sensor and an EEG sensor in the HMD 101. The physical object-based sensor data may include an image of the physical objects 116, 118, a temperature of the physical objects 116, 118 by using, for example, a camera and an infrared sensor in the HMD 101. The ambient-based sensor data may include an ambient pressure, an ambient humidity level, an ambient light level, and an ambient noise level by using, for example, a barometer, a humidity sensor, a light sensor, or a microphone in the HMD 101.

The HMD 101 may determine and identify a potential threat to the user 102 based on the combination of HMD-based sensor data, user-based sensor data, physical object-based sensor data, and ambient-based sensor data. In one example embodiment, the HMD 101 receives preconfigured parameters (e.g., safe ranges, and safe thresholds for corresponding sensors) associated with a threat and performs the analysis locally on the HMD 101 by comparing the sensor-based data with the preconfigured parameters. If the HMD 101 determines that one or more of the sensor data matches one or more of the preconfigured parameters, the HMD 101 notifies the user 102 by generating an audio or visual alert in the HMD 101. The HMD 101 may further provide the user 102 with instructions on how to remedy or correct an operation on the physical objects 116, 118 to dissipate the threat. If HMD 101 determines that no action from the user 102 can dissipate the threat, the HMD 101 may cause a display of a virtual evacuation route or path in the transparent display of the HMD 101.

In another example embodiment, the HMD 101 streams or provides sensor-data to the server 110 so that the server 110 performs a threat analysis. For example, the server 110 may already be configured with preconfigured parameters associated with threats and user tasks. For example, the temperature of a gauge may not exceed a threshold after the user 102 turns a valve in step 3 of a maintenance operation of a machine.

Furthermore, external sensors 112 may be associated with, coupled to, or related to the objects 116 and 118 in the physical environment 114 to measure a location, information, or captured readings from the objects 116 and 118. Examples of captured readings may include but are not limited to weight, pressure, temperature, velocity, direction, position, intrinsic and extrinsic properties, acceleration, and dimensions. For example, sensors 112 may be disposed throughout a factory floor to measure movement, pressure, orientation, and temperature. The server 110 can compute readings from data generated by the sensors 112.

The sensors 112 may include other sensors used to track the location, movement, and orientation of the HMD 101 externally without having to rely on the sensors 112 internal to the HMD 101. The sensors 112 may include optical sensors (e.g., depth-enabled 3D camera), wireless sensors (Bluetooth, Wi-Fi), GPS sensor, and audio sensors to determine the location of the user 102 having the HMD 101, distance of the user 102 to the tracking sensors 112 in the physical environment 114 (e.g., sensors 112 placed in corners of a venue or a room), the orientation of the HMD 101 to track what the user 102 is looking at (e.g., direction at which the HMD 101 is pointed, HMD 101 pointed towards a player on a tennis court, HMD 101 pointed at a person in a room).

The server 110 may perform a threat analysis based on data from the sensors 112 and internal sensors in the HMD 101. Alternatively, the HMD 101 may receive sensor data from sensors 112 and perform the threat analysis locally on the HMD 101.

In another embodiment, data from the sensors 112 and internal sensors in the HMD 101 may be used for analytics data processing at the server 110 (or another server) for analysis on usage and how the user 102 is interacting with the physical environment 114. Live data from other servers 110 may also be used in the analytics data processing. For example, the analytics data may track at what locations (e.g., points or features) on the physical or virtual object the user 102 has looked, how long the user 102 has looked at each location on the physical or virtual object, how the user 102 moved with the HMD 101 when looking at the physical or virtual object, which features of the virtual object the user 102 interacted with (e.g., such as whether a user 102 tapped on a link in the virtual object), and any suitable combination thereof. The HMD 101 receives a visualization content dataset related to the analytics data. The HMD 101 then generates a virtual object with additional or visualization features, or a new experience, based on the visualization content dataset.

In another example embodiment, the server 110 collects sensor data from one or more HMD 101s. The server 110 may determine and identify a potential threat to the user 102 based on the combined sensor data from all HMD 101s. For example, a first HMD 101 is located at a first location of a factory plant. A second HMD 101 is located at a second location, proximate to the first location, of the factory plant. The server 110 receives sensor data from both the first HMD 101 at the first location and the second HMD 101 at the second location. The sensor data indicates that an engine is overheating at the first location and that the pressure in a valve exceeds a safe pressure level. The server 110 identifies a threat (e.g., the combination of unsafe temperature of the engine and unsafe pressure of the valve may cause both to explode). Once the server 110 has identified the threat, the server 110 can generate instructions to the first HMD 101, the second HMD 101, of both HMD 101s. For example, the server 110 may generate instructions only to the second HMD 101 if the server 110 determines that shutting off the valve at the second location will reduce the temperature of the engine at the first location. In another example, the server 110 may generate a first instruction to the first HMD 101 to turn off the engine, and a second instruction to the second HMD 101 to turn on the valve by a quarter turn.

In another example embodiment, the server 110 determines a threat pattern by mining historical sensor-data. The server 110 determines user actions that have contributed to negative outcome (e.g., engine overheats or high pressure). For example, the server 110 may determine that an engine typically overheats when the user 102 turns a dial by a half-turn instead of a quarter-turn on step 5 of a task. Therefore, the server 110 learns and generates a threat pattern that specifies that a threat is identified if the dial is half-turned instead of quarter-turned on step 5 of a task. Once the server 110 determines that sensor data from the HMD 101 matches the threat pattern, the server 110 generates instructions to the user 102 to correct the action (e.g., turn the dial back by a quarter turn).

In another example embodiment, the AR application may provide the user 102 with an AR experience triggered by identified objects in the physical environment 114. The physical environment 114 may include identifiable objects such as a 2D physical object (e.g., a picture), a 3D physical object (e.g., a factory machine), a location (e.g., at the bottom floor of a factory), or any references (e.g., perceived corners of walls or furniture) in the real world physical environment 114. The AR application may include computer vision recognition to determine corners, objects, lines, and letters. The user 102 may point a camera of the HMD 101 to capture an image of the objects 116 and 118 in the physical environment 114.

In one example embodiment, the objects 116, 118 in the image are tracked and recognized locally in the HMD 101 using a local context recognition dataset or any other previously stored dataset of the AR application of the HMD 101. The local context recognition dataset module may include a library of virtual objects associated with real-world physical objects 116, 118 or references. In one example, the HMD 101 identifies feature points in an image of the objects 116, 118 to determine different planes (e.g., edges, corners, surfaces, dials, letters). The HMD 101 may also identify tracking data related to the objects 116, 118 (e.g., GPS location of the HMD 101, orientation, distances to objects 116, 118). If the captured image is not recognized locally at the HMD 101, the HMD 101 can download additional information (e.g., 3D model or other augmented data) corresponding to the captured image, from a database of the server 110 over the network 108.

In another embodiment, the objects 116, 118 in the image are tracked and recognized remotely at the server 110 using a remote context recognition dataset or any other previously stored dataset of an AR application in the server 110. The remote context recognition dataset module may include a library of virtual objects or augmented information associated with real-world physical objects 116, 118 or references.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., HMD 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
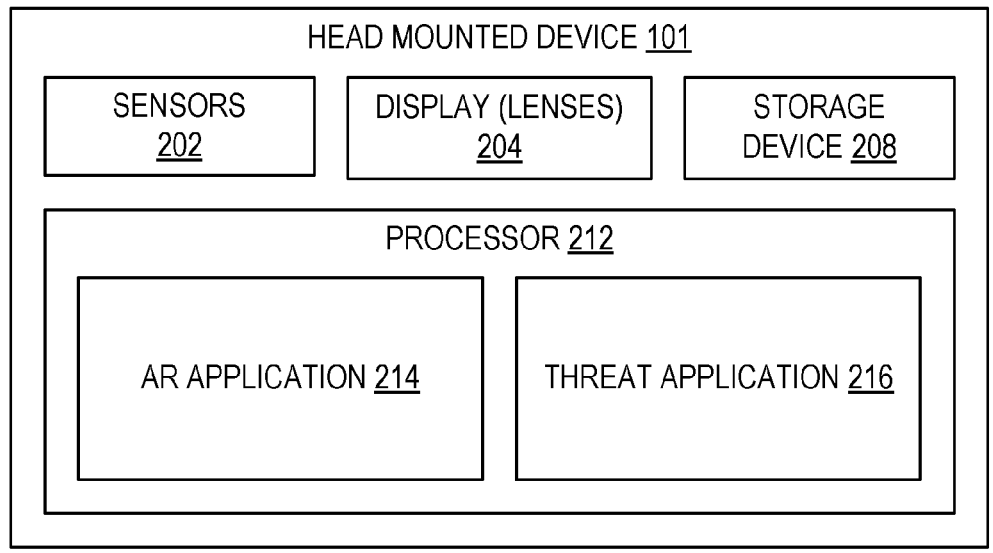
FIG. 2 is a block diagram illustrating an example embodiment of a head mounted device.

FIG. 2 is a block diagram illustrating modules (e.g., components) of the HMD 101, according to some example embodiments. The HMD 101 may be a helmet that includes sensors 202, a display 204, a storage device 208, and a processor 212. The HMD 101 may not be limited to a helmet and may include any type of device that can be worn on the head of a user 102, such as a headband, a hat, or a visor.

The sensors 202 may be used to generate internal tracking data of the HMD 101 to determine a geographic location, a position, and an orientation of the HMD 101. The geographic location may be determined by using, for example, a GPS device. The position and the orientation of the HMD 101 may be used to determine a field of view of the user 102. For example, the direction in which the user 102 is looking may be determined based on the position and orientation of the HMD 101 worn by the user 102. Therefore, the sensors 202 may be used to determine whether the HMD 101 is oriented towards a real world object (e.g., when the user 102 looks at object 116) or in a particular direction (e.g., when the user 102 tilts his head to watch his wrist). Furthermore, sensors 202 may be used to identify real world objects in a field of view of the HMD 101. For example, a virtual object may be rendered and displayed in the display 204 when the sensors 202 indicate that the HMD 101 is oriented towards at object 116. The virtual object may be based on a combination sensor data from the sensors 202. As previously described, sensors 202 may also be used to generate sensor data including HMD-based sensor data, user-based sensor data, ambient-based sensor data, and user-based sensor data.

Figure 3:
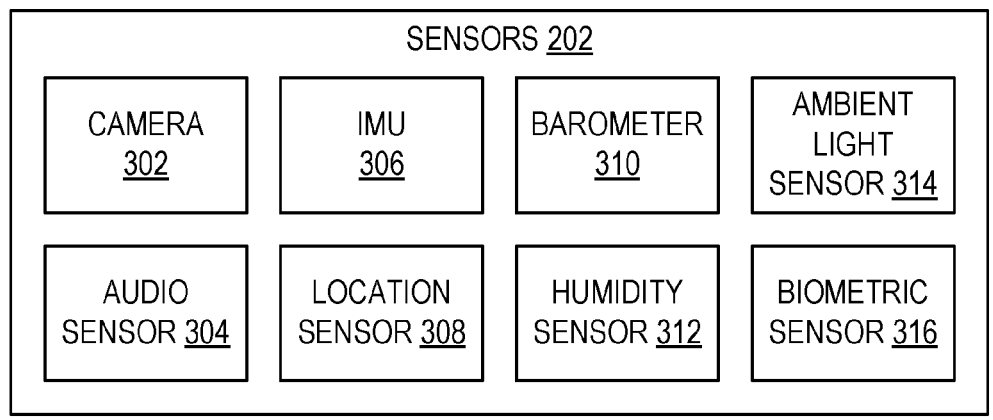
FIG. 3 is a block diagram illustrating examples of sensors.

FIG. 3 is a block diagram illustrating examples of sensors. For example, the sensors 202 may include a camera 302, an audio sensor 304, an IMU sensor 306, a location sensor 308, a barometer 310, a humidity sensor 312, an ambient light sensor 314, and a biometric sensor 316. It is noted that the sensors 202 described herein are for illustration purposes. Sensors 202 are thus not limited to the ones described.

The camera 302 includes an optical sensor(s) (e.g., camera) that may encompass different spectra. The camera 302 may include one or more external cameras aimed outside the HMD 101. For example, the external camera may include an infrared camera or a full spectrum camera. The external camera may include rear facing camera and front facing camera disposed in the HMD 101. The front facing camera may be used to capture a front field of view of the HMD 101 while the rear facing camera may be used to capture a rear field of view of the HMD 101. The pictures captured with the front and rear facing cameras may be combined to recreate a 360 degree view of the physical world around the HMD 101.

The camera 302 may include one or more internal cameras aimed at the user 102. The internal camera may include an infrared (IR) camera configured to capture an image of a retina of the user 102. The IR camera may be used to perform a retinal scan to map unique patterns of the retina of the user 102. Blood vessels within the retina absorb light more readily than the surrounding tissue in the retina and therefore can be identified with IR lighting. The IR camera may cast a beam of IR light into the user's eye as the user 102 looks through the display 204 (e.g., lenses) towards virtual objects rendered in the display 204. The beam of IR light traces a path on the retina of the user 102. Because retinal blood vessels absorb more of the IR light than the rest of the eye, the amount of reflection varies during the retinal scan. The pattern of variations may be used as a biometric data unique to the user 102.

In another example embodiment, the internal camera may include an ocular camera configured to capture an image of an iris in the eye of the user 102. In response to the amount of light entering the eye, muscles attached to the iris expand or contract the aperture at the center of the iris, known as the pupil. The expansion and contraction of the pupil depends on the amount of ambient light. The ocular camera may use iris recognition as a method for biometric identification. The complex pattern on the iris of the eye of the user 102 is unique and can be used to identify the user 102. The ocular camera may cast infrared light to acquire images of detailed structures of the iris of the eye of the user 102. Biometric algorithms may be applied to the image of the detailed structures of the iris to identify the user 102.

In another example embodiment, the ocular camera includes an IR pupil dimension sensor that is pointed at an eye of the user 102 to measure the size of the pupil of the user 102. The IR pupil dimension sensor may sample the size of the pupil (e.g., using an IR camera) on a periodic basis or based on predefined triggered events (e.g., user 102 walks into a different room, sudden changes in the ambient light, or the like).

The audio sensor 304 may include a microphone. For example, the microphone may be used to record a voice command from the user 102 of the HMD 101. In other examples, the microphone may be used to measure ambient noise level to measure the intensity of the background noise. In another example, the microphone may be used to capture ambient noise. Analytics may be applied to the captured ambient noise to identify specific type of noises such as explosions or gunshot noises.

The IMU 306 may include a gyroscope and an inertial motion sensor to determine an orientation and movement of the HMD 101. For example, the IMU 306 may measure the velocity, orientation, and gravitational forces on the HMD 101. The IMU 306 may also detect a rate of acceleration using an accelerometer and changes in angular rotation using a gyroscope.

The location sensor 308 may determine a geolocation of the HMD 101 using a variety of techniques such as near field communication, GPS, Bluetooth, Wi-Fi. For example, the location sensor 308 may generate geographic coordinates of the HMD 101.

The barometric sensor 310 may measure atmospheric pressure differential to determine an altitude of the HMD 101. For example, the barometric sensor 310 may be used to determine whether the HMD 101 is located on a first floor or a second floor of a building.

The humidity sensor 312 may determine a relative humidity level ambient to the HMD 101. For example, the humidity sensor 312 determines the humidity level of a room in which the HMD 101 is located.

The ambient light sensor 314 may determine an ambient light intensity around the HMD 101. For example, the ambient light sensor 314 measures the ambient light in a room in which the HMD 101 is located.

The biometric sensor 316 includes sensors configured to measure biometric data unique to the user 102 of the HMD 101. In one example embodiment, the biometric sensors 316 include an ocular camera, an EEG (electroencephalogram) sensor, and an ECG (electrocardiogram) sensor. It is noted that the biometric sensor 316 described herein are for illustration purposes. Biometric sensors 316 are thus not limited to the ones described.

The EEG sensor includes, for example, electrodes that, when in contact with the skin of the head of the user 102, measure electrical activity of the brain of the user 102. The EEG sensor may also measure the electrical activity and wave patterns through different bands of frequency (e.g., Delta, Theta, Alpha, Beta, Gamma, Mu). EEG signals may be used to authenticate a user 102 based on fluctuation patterns unique to the user 102.

The ECG sensor includes, for example, electrodes that measure a heart rate of the user 102. In particular, the ECG may monitor and measure the cardiac rhythm of the user 102. A biometric algorithm is applied to the user 102 to identify and authenticate the user 102. In one example embodiment, the EEG sensor and ECG sensor may be combined into a same set of electrodes to measure both brain electrical activity and heart rate. The set of electrodes may be disposed around the helmet so that the set of electrodes comes into contact with the skin of the user 102 when the user 102 wears the HMD 101.

Referring back to FIG. 2, the display 204 may include a display (e.g., display surface, lens) capable of displaying AR content (e.g., images, video) generated by the processor 212. The display 204 may be transparent so that the user 102 can see through the display 204 (e.g., such as in a head-up display).

The storage device 208 stores a library of AR content. The AR content may be associated with a specific user task. For example, a user task may be assembling a component. The AR content associated with the task may display virtual objects to show how to assemble the component step by step. The AR content may be associated with the user 102 (e.g., a technician level 2 may have access to AR content related to the technician's duties and responsibilities). The AR content may be downloaded from the server 110 based on an authentication of the user 102 with the HMD 101. The AR content may include two or three dimensional models of virtual objects with corresponding audio. In other examples, the AR content may include an AR application that includes interactive features such as displaying additional data (e.g., location of sprinklers) in response to the user input (e.g., user 102 says "show me the locations of the sprinklers" while looking at an AR overlay showing location of the exit doors). AR applications may have their own different functionalities and operations. Therefore, each AR application may operate distinctly from other AR applications.

The storage device 208 may also store sensor data from sensors 202, and threat patterns. The sensor data may be associated with the user 102 and the HMD 101. For example, the storage device 208 may store HMD-based sensor data, user-based sensor data, physical object-based sensor data, and ambient-based sensor data. The threat pattern may include preconfigured thresholds for a combination of the sensor data. For example, a threat pattern may include a temperature threshold associated with a user task (e.g., user 102 turns on a valve). The threat pattern may be based on historical sensor data or preconfigured ranges, parameters, or attributes for one or more sensors 202. In one example embodiment, the HMD 101 downloads the threat pattern from the server 110.

An example of preconfigured ranges may include preconfigured ranges for ambient-based sensor data associated with a user task or step of an AR content or application. For example, the ambient-based sensor data may identify a predefined location, a humidity level range, a temperature range for the corresponding AR content. Therefore, a threat pattern may be identified when the HMD 101 is located at the predefined location, when the HMD 101 detects a humidity level within the humidity level range, and when the HMD 101 detects a temperature within the temperature range.

Another example of preconfigured ranges may include preconfigured ranges for user-based sensor data associated with a user task or step of an AR content or application. For example, the user-based sensor data may identify a state of mind of the user 102, physiological aspects of the user 102, reference biometric data, user identification, and a user privilege level. Therefore, a threat pattern may be identified when the HMD 101 detects that the user 102 is distracted, sweating, and is identified as a technician. The state of mind of the user 102 may be measured with EEG/ECG sensors connected to the user 102 to determine a level of attention of the user 102 (e.g., distracted or focused). The physiological aspects of the user 102 may include biometric data that was previously captured and associated with a user 102 during a configuration process. The ranges for biometric data may be associated with a user 102. The user identification may include the name and title of the user 102 (e.g., John Doe, VP of engineering). The user privilege level may identify which content the user 102 may have access to (e.g., access level 5 means that the user 102 may have access to content in virtual objects that are tagged with level 5). Other tags or metadata may be used to identify the user privilege level (e.g, "classified", "top secret", "public").

The storage device 208 may also store a database of identifiers of wearable devices capable of communicating with the HMD 101. In another embodiment, the database may also identify reference objects (visual references or images of objects) and corresponding experiences (e.g., 3D virtual objects, interactive features of the 3D virtual objects). The database may include a primary content dataset, a contextual content dataset, and a visualization content dataset. The primary content dataset includes, for example, a first set of images and corresponding experiences (e.g., interaction with 3D virtual object models). For example, an image may be associated with one or more virtual object models. The primary content dataset may include a core set of images or the most popular images determined by the server 110. The core set of images may include a limited number of images identified by the server 110. For example, the core set of images may include the images depicting covers of the ten most viewed devices and their corresponding experiences (e.g., virtual objects that represent the ten most viewed sensing devices in a factory floor). In another example, the server 110 may generate the first set of images based on the most popular or often scanned images received at the server 110. Thus, the primary content dataset does not depend on objects 116, 118 or images scanned by the HMD 101.

The contextual content dataset includes, for example, a second set of images and corresponding experiences (e.g., three-dimensional virtual object models) retrieved from the server 110. For example, images captured with the HMD 101 that are not recognized (e.g., by the server 110) in the primary content dataset are submitted to the server 110 for recognition. If the captured image is recognized by the server 110, a corresponding experience may be downloaded at the HMD 101 and stored in the contextual content dataset. Thus, the contextual content dataset relies on the contexts in which the HMD 101 has been used. As such, the contextual content dataset depends on objects or images scanned by the HMD AR application 214 of the HMD 101.

In one example embodiment, the HMD 101 may communicate over the network 108 with the server 110 to access a database of ambient-based context, user-based content context, reference objects, and corresponding AR content at the server 110 to compare with the ambient-based sensor data with attributes from the ambient-based context, the ambient-based sensor data with attributes from the user-based context. The HMD 101 may also communicate with the server 110 to authenticate the user 102. In another example embodiment, the HMD 101 retrieves a portion of a database of visual references, corresponding 3D virtual objects, and corresponding interactive features of the 3D virtual objects.

The processor 212 may include an AR application 214 and a threat application 216. The AR application 214 generates a display of information related to the objects 116, 118. In one example embodiment, the AR application 214 generates a visualization of information related to the objects 116, 118 when the HMD 101 captures an image of the objects 116, 118 and recognizes the objects 116, 118 or when the HMD 101 is in proximity to the objects 116, 118. For example, the AR application 214 generates a display of a holographic or virtual menu visually perceived as a layer on the objects 116, 118.

The AR application 214 may display instructions or virtual objects demonstrating how to operate physical object 116. The virtual objects may include three-dimensional objects that appear as a layer on top of the physical object 116. In one example embodiment, the three-dimensional objects may be scaled and positioned on corresponding parts of the physical object 116 so that the three-dimensional objects appear to be part of the physical object 116.

The AR application 214 may cause the display 204 to display an alert or a notification of a threat. The notification may identify the threat and include instructions for the user 102 to diffuse the threat. For example, the notification may alert the user 102 that an engine is overheating, and to turn off a valve and push a particular switch. The notification may be implemented as AR content (e.g., red color flashes on top of the button to indicate which button to press, virtual arrows may show the direction in which to turn the valve). In another example, the HMD 101 notifies another HMD in a same factory so that another user may assist in diffusing the threat. Another user in the same factory may be a similarly skilled technician that can intervene remotely by turning off a master switch or can communicate with the user 102 to provide further assistance and guidance (e.g., via voice communication). In another example, the alert may include evacuation instructions for the user 102 if the threat cannot be diffused. Virtual arrows may be displayed on the floor of a factory to show an exit path and guide the user 102 to the exit.

The threat application 216 may learn and generate a threat pattern based on sensor data from sensors 202. For example, the threat application 216 may identify a series of actions taken by the user 102 leading to a negative outcome (e.g., engine temperature exceeding a safety temperature threshold). The threat pattern includes an identification of user actions such that when the user 102 later repeats the same series of user actions, the threat application 216 generates an alert that the engine may overheat before the engine actually overheats.

Furthermore, the threat application 216 may identify and determine a threat based on sensor data from sensors 202 and the task of the user 102 (e.g., maintenance of an engine). The threat application 216 monitors the sensor data and compares the sensor data to the threat pattern stored in storage device 208. For example, the threat application 216 determines whether the sensor data meet a combination of preconfigured parameters of the threat pattern (e.g., engine temperature $t_1$ exceeds safety temperature threshold $t_s$ after turning valve $v_1$ and pressing switch $s_1$), and identifies the corresponding threat (e.g., engine overheat). The threat application 216 communicates AR content to the AR application 214 to display an alert and instructions to remedy the threat (e.g., virtual arrow pointing to a button for the user 102 to push).

Figure 4:
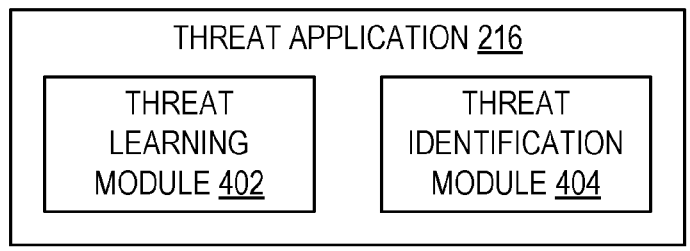
FIG. 4 is a block diagram illustrating an example embodiment of a threat application.

FIG. 4 is a block diagram illustrating an example embodiment of the threat application 216. The threat application 216 is shown by way of example to include a threat learning module 402 and a threat identification module 404. The threat learning module 402 generates a threat pattern for the threat identification module 404 to recognize based on sensor data. For example, the threat learning module 402 may access preconfigured parameters for the sensor data in storage device 208 to generate a threat pattern. For example, for a user task of repairing an engine, components c1, c2, c3 should be present, and the temperature of engine should be between t1 and t2 after step 6 of the repair instructions. The threat pattern may thus include:

Present component after step 6: components c1, c2, c3
Acceptable engine temperature after step 6: t1 to t2

Therefore, a threat is detected if component c2 is missing or engine temperature is outside the range t1-t2 after step 6. Other examples of preconfigured parameters include ambient pressure ranges, user temperature ranges, humidity ranges, brightness ranges. Another example of a threat pattern includes ranges for each sensor corresponding to each user task in a series of user tasks. For example, humidity level should be between h1 and h2 at steps 3 of a series of user tasks and the heart rate of the user 102 should be between h1 and h2 during the entire series of user tasks. The threat pattern may be stored locally in the storage device 208 or remotely on server 110.

In another example embodiment, the threat learning module 402 accesses historical activities of user 102 when performing a task with the AR application 214. For example, the AR application 214 may display a repair task as a series of steps (e.g., display a first step showing virtual arrow to flip a switch, detect that the user 102 has operated the first step by flipping the switch, display a second step showing a blink color on a button, detect that the user 102 has pressed the button). Sensor data is recorded for each user activity. The historical activities include user activities and corresponding sensor data resulting after each user action. The threat learning module 402 identifies user actions that have resulted in a negative outcome by detecting that a combination of the sensor data has fallen out of safety range. For example, the threat learning module 402 identifies that user 102 has turned a dial up right before an engine overheats. Therefore, the threat learning module 402 generates the threat pattern based on user actions that have resulted in a negative outcome. In another example, the threat learning module 402 identifies user actions that have led to the engine overheating and compiles a list of the user actions for the threat pattern. For example, a user 102 has previously flipped switch s1 right before the engine overheats. In another time, the user 102 has pressed button b1 right before the engine overheats. Thus, the threat learning module 402 includes flipping switch s1 and pressing button b1 in the threat pattern. Similarly, the threat pattern may be stored locally in the storage device 208 or remotely on server 110.

In another example embodiment, the threat learning module 402 generates the threat pattern based on other users' actions that have resulting in a negative outcome (e.g., engine overheat, high pressure). The threat learning module 402 may receive sensor data from other HMDs and corresponding user actions. The threat learning module 402 may filter all user activities that have led to negative outcomes and generate threat patterns based on the filtered user activities using the sensor data and the corresponding task of the AR application 214 (e.g. AR application for showing how to build a component). In another example embodiment, the threat learning module 402 communicates the sensor data and user activities to the server 110. The server 110 receives collective sensor data from all HMDs connected to the server 110. The server 110 can then filter all user activities that have led to negative outcomes using the sensor data and generate threat patterns based on the filtered user activities and the corresponding task of the AR application 214 in each HMD.

The threat identification module 404 receives sensor data from sensors 202 and accesses the threat pattern from storage device 208. The threat identification module 404 compares the sensor data to the threat pattern to identify a match or determine whether any of the sensor data match the threat pattern. For example, the treat pattern may include ambient-based thresholds. Thus, the threat identification module 404 may compare ambient-based sensor data from sensors 202 with ambient-based thresholds to identify a threat. For example, if the ambient pressure exceeds a safety pressure threshold, the threat identification module 404 generates a warning notification to the user 102 or causes the AR application 214 to generate the warning notification.

In another example embodiment, the threat identification module 404 generates a suggested course of action for the user 102 to take to dissipate the threat. The suggested course of action may be based on historical user activities and corresponding historical sensor data. Therefore, if a user 102 has turned on valve v1, the threat identification module 404 may suggest the user 102 turn off valve v1 since turning on valve v1 during step x of series of user actions has typically resulted in engine overheating. The threat identification module 404 may communicate the suggested course of action or corrective measure to the AR application 214 to display virtual guides (e.g., arrows) in the display 204. If the threat identification module 404 determines that no user actions can dissipate the threat, the threat identification module 404 may suggest an evacuation route to the user 102. The threat identification module 404 may also broadcast a warning notification to other users in the same location (e.g., factory plant).

Any one or more of the modules described herein may be implemented using hardware (e.g., a processor 212 of a machine) or a combination of hardware and software. For example, any module described herein may configure a processor 212 to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 5:
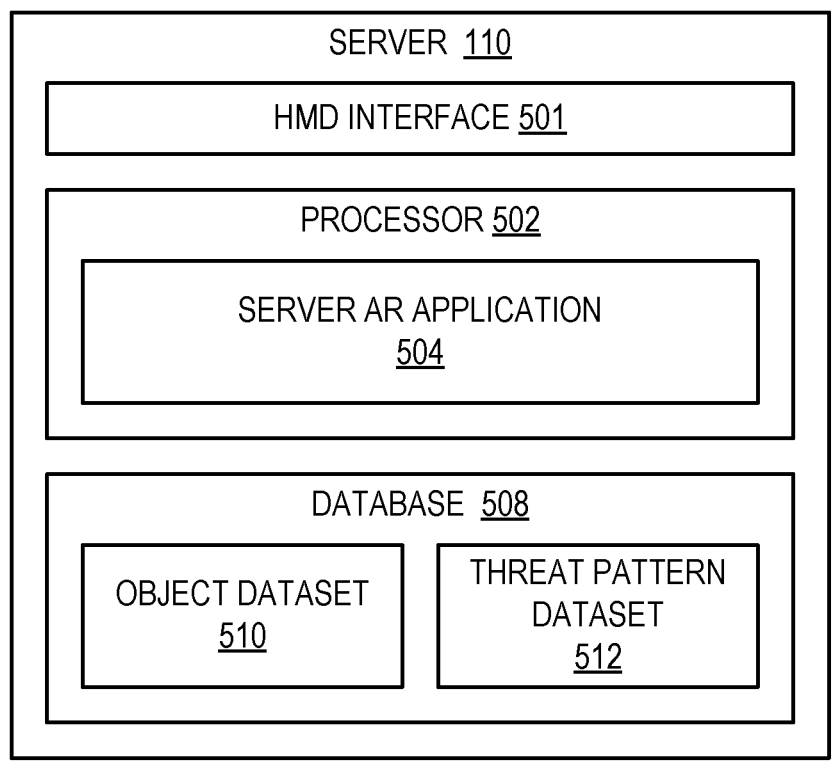
FIG. 5 is a block diagram illustrating an example embodiment of a server.

FIG. 5 is a block diagram illustrating modules (e.g., components) of the server 110. The server 110 includes an HMD interface 501, a processor 502, and a database 508. The HMD interface 501 may communicate with the HMD 101, and sensors 112 (FIG. 1) to receive real time data.

The processor 502 may include a server AR application 504. The server AR application 504 identifies real world physical objects 116, 118 based on a picture or image frame received from the HMD 101. In another example, the HMD 101 has already identified objects 116, 118 and provides the identification information to the server AR application 504. In another example embodiment, the server AR application 504 may determine the physical characteristics associated with the real world physical objects 116, 118. For example, if the real world physical object 116 is a gauge, the physical characteristics may include functions associated with the gauge, location of the gauge, reading of the gauge, other devices connected to the gauge, safety thresholds or parameters for the gauge. AR content may be generated based on the real world physical object 116 identified and a status of the real world physical object 116.

The server AR application 504 may generate a threat pattern based on preconfigured parameters for sensor data from HMD 101s or based on historical user activities that have resulted in negative outcomes. In one example embodiment, the server AR application 504 receives preconfigured parameters for sensor data for the HMD 101 based on the user task. For example, the temperature of an engine should be between t1 and t2 during step x of a repair operation provided by the AR application 214 or the server AR application 504. The server AR application 504 generates a threat pattern based on the preconfigured parameters for sensor data for the HMD 101 based on the user task.

In another example embodiment, the server AR application 504 filters historical user activities from all HMD 101s to determine user activities and corresponding sensor data that have resulted in negative outcomes. The server AR application 504 then generates a threat pattern based on the filtered historical user activities from all HMD 101s and corresponding sensor data that have resulted in negative outcomes.

The server AR application 504 may provide the threat pattern to the HMD 101s based on the task of a user 102 of the HMD 101 or the identity of the user 102. For example, the server AR application 504 provides a threat pattern for the maintenance of a particular machine to the user 102 of the HMD 101 performing the maintenance of the particular machine. In another example, the server AR application 504 provides threat patterns associated with a task application launched within the AR application 214 (e.g., user 102 launches an AR application 214 to guide the user 102 on how to operate a machine), task of the user 102 (e.g., user 102 fixing a machine), the position of the user 102 (e.g., supervisor, maintenance worker), the geographic location of the user 102 (e.g., factory building, geofence area), or a combination thereof.

The database 508 may store an object dataset 510 and a threat pattern dataset 512. The object dataset 510 may include a primary content dataset and a contextual content dataset. The primary content dataset comprises a first set of images and corresponding virtual object models. The contextual content dataset may include a second set of images and corresponding virtual object models. The threat pattern dataset 512 includes a library of threat pattern, corresponding AR application 214, corresponding user task, corresponding preconfigured parameters, corresponding user credentials.

Figure 6:
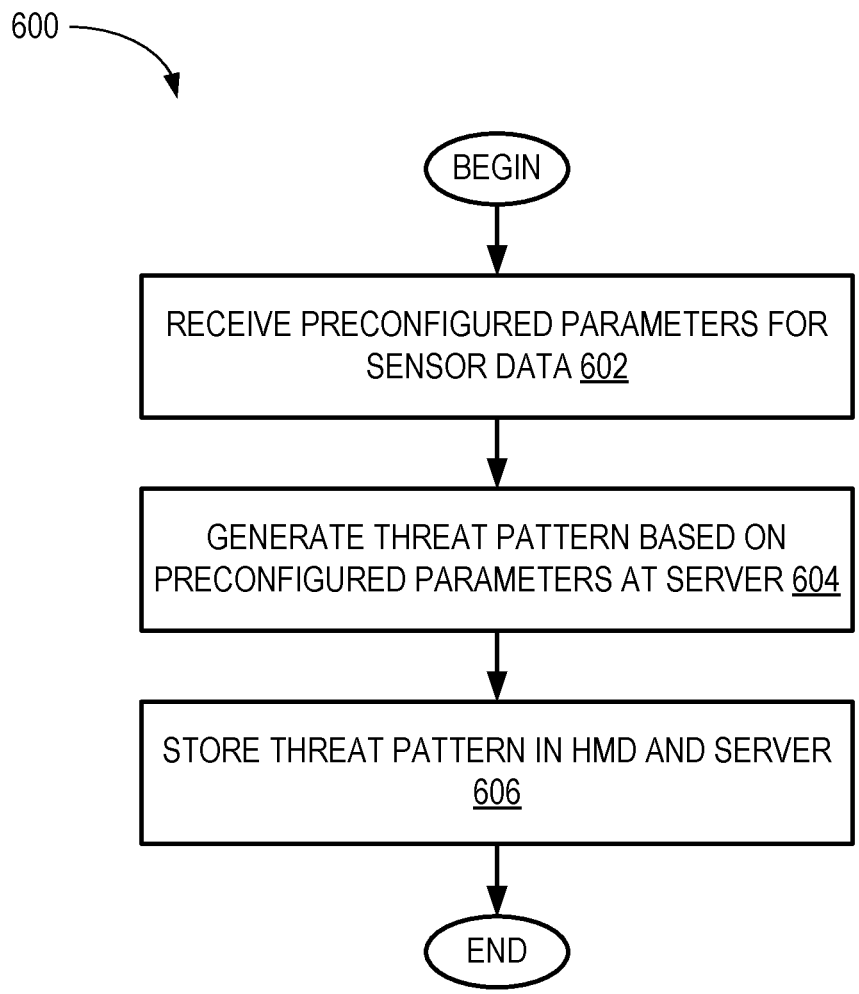
FIG. 6 is a flowchart illustrating a method for generating a threat pattern based on preconfigured parameters at a server, according to an example embodiment.

FIG. 6 is a flowchart illustrating a method 600 for generating a threat pattern based on preconfigured parameters at a server 110, according to an example embodiment. The method 600 may be deployed on the server 110 or on the HMD 101 and, accordingly, is described merely by way of example with reference thereto. At operation 602, the server 110 receives or accesses preconfigured parameters for sensor data. The sensor data may include sensor data from HMD 101 or aggregate HMDs. In one example embodiment, a user 102 configures and enters a range for one of the attribute of the sensor data (e.g., safe temperature range between t1 and t2 for temperature sensor of an engine during steps 1 through 5 of a maintenance operation). In another example embodiment, the user 102 configures a range for one or more sensors 112 external to the HMD 101. Operation 602 may be implemented with the server AR application 504 of server 110 or the threat application 216 of HMD 101.

At operation 604, a threat pattern is generated based on the preconfigured parameters for the sensor data from operation 602. In one example embodiment, operation 604 may be implemented with the server AR application 504 of server 110 or the threat learning module 402 of HMD 101. The threat pattern is stored in the threat pattern dataset 512 of the server 110 or in the storage device 208 of HMD 101 at operation 606.

Figure 7:
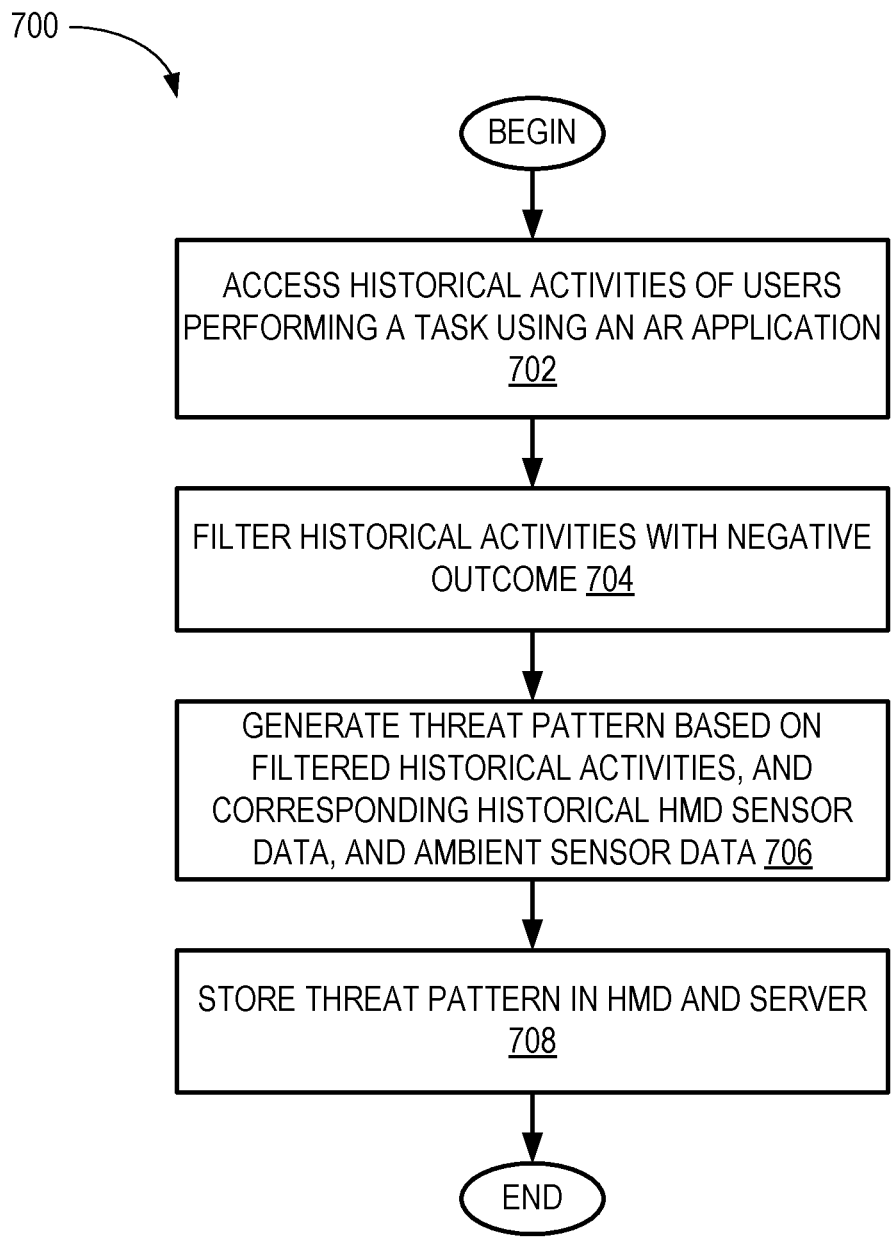
FIG. 7 is a flowchart illustrating a method for generating a threat pattern based on filtered historical activities, corresponding historical HMD sensor data, and ambient sensor data, according to an example embodiment.

FIG. 7 is a flowchart illustrating a method 700 for generating a threat pattern based on filtered historical activities, corresponding historical HMD sensor data, and ambient sensor data, according to an example embodiment. The method 700 may be deployed on the server 110 or on the HMD 101 and, accordingly, is described merely by way of example with reference thereto. At operation 702, the server 110 accesses historical activities of the user 102 of an HMD 101, or from users of other HMDs. For example, the server 110 accesses activities related to a user 102 performing a task using the AR application 214. The user activities may include flipping a switch up, turning a dial clockwise by a quarter turn, etc. Sensors 202 connected to the components or devices may be used to determine the position of the switch or dial or position of a component relative to another. Machine vision may be used to determine the position of a component.

At operation 704, the server 110 filters out historical activities with a negative outcome from the historical activities of the user 102 of the HMD 101. As previously described, the negative outcome may be defined based on preconfigured parameters for the sensor data (e.g., safety ranges to identify when one of the sensor data exceeds a predefined safety threshold). For example, the negative outcome is identified when a pressure exceeds a predefined safety threshold pressure for a valve. The server 110 filters historical sensor data with negative outcomes from the historical sensor data to identify user actions that have triggered the negative outcome. In one example embodiment, operation 704 may be implemented with the server AR application 504 of server 110 or the threat learning module 402 of HMD 101.

At operation 706, the server 110 generates a threat pattern based on the filtered historical activities having a negative outcome and based on corresponding sensor data. For example, the server 110 may identify user activities that have contributed to negative outcomes to generate the threat pattern. In one example embodiment, operation 706 may be implemented with the server AR application 504 of server 110 or the threat learning module 402 of HMD 101.

At operation 708, the server 110 stores the threat pattern in the threat pattern dataset 512 of the server 110 or in the storage device 208 of HMD 101.

Figure 8:
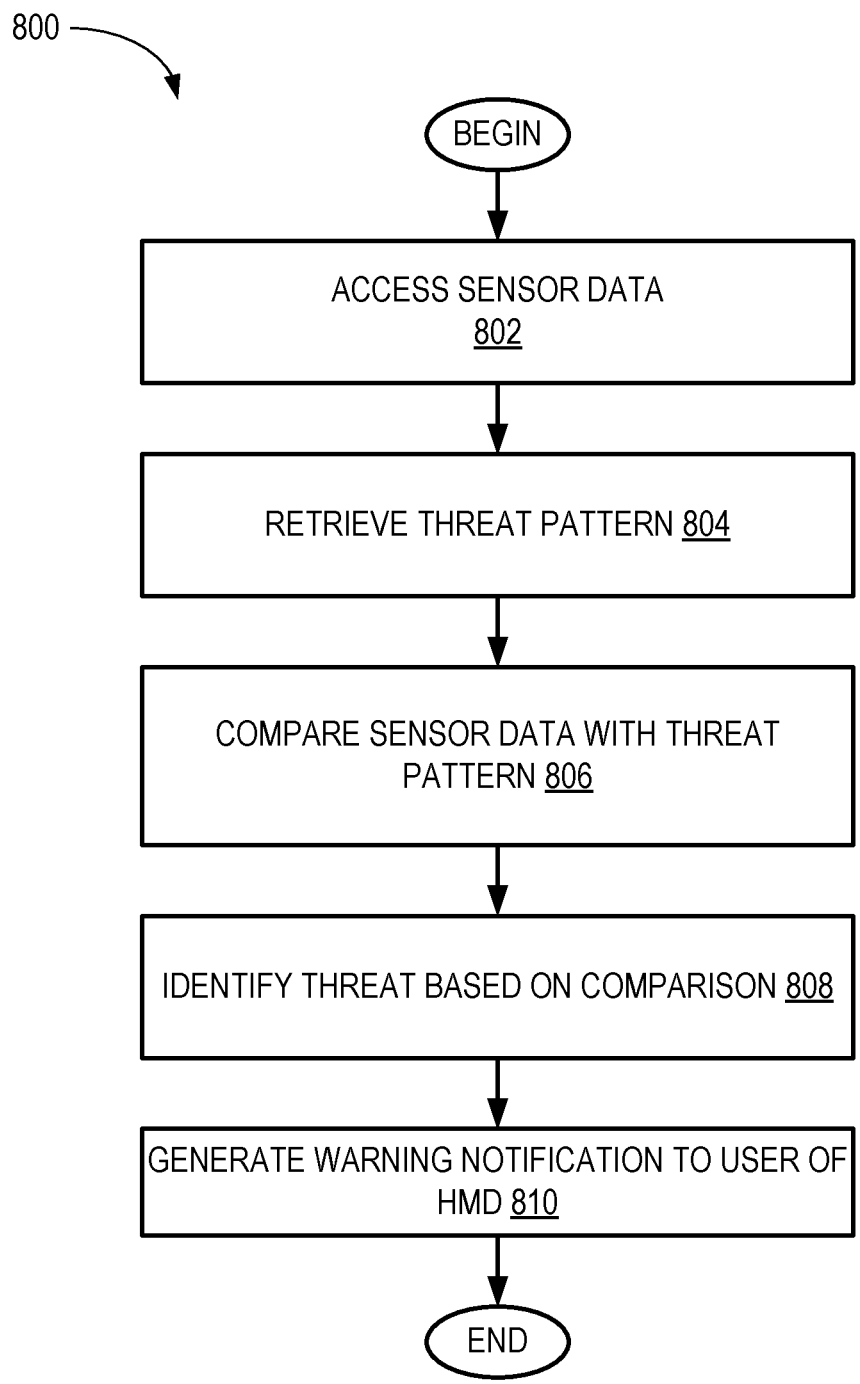
FIG. 8 is a flowchart illustrating a method for identifying a threat based on the threat pattern, according to an example embodiment.

FIG. 8 is a flowchart illustrating a method 800 for identifying a threat based on the threat pattern, according to an example embodiment. The method 800 may be deployed on the server 110 or on the HMD 101 and, accordingly, is described merely by way of example with reference thereto. At operation 802, the HMD 101 accesses sensor data. The sensor data may be generated by sensors internal to the HMD 101 or sensors 112 external to the HMD 101. As previously described, the sensor data includes HMD-based sensor data, user-based sensor data, physical object-based sensor data, and ambient-based sensor data. Operation 802 may be implemented with the threat application 216 of HMD 101.

At operation 804, the HMD 101 retrieves the threat pattern locally from the storage device 208 of the HMD 101 or remotely from the threat pattern dataset 512 from the server 110. Operation 804 may be implemented with the threat identification module 404 in HMD 101.

At operation 806, the HMD 101 compares sensor data with the threat pattern to determine whether the sensor data matches or is outside of safety ranges specified in the threat pattern, or falls within safe ranges. Operation 806 may be implemented with the threat identification module 404 in HMD 101.

At operation 808, the HMD 101 identifies the threat based on the comparison. For example, the threat may be an imminent overheated engine as a result of the user 102 turning the wrong valve or flipping a switch in the wrong direction. At operation 810, the HMD 101 generates a warning notification identifying the threat to the user 102 of the HMD 101 in the display 204. The warning notification may include instructions to the user 102 on how to address the threat.

Figure 9:
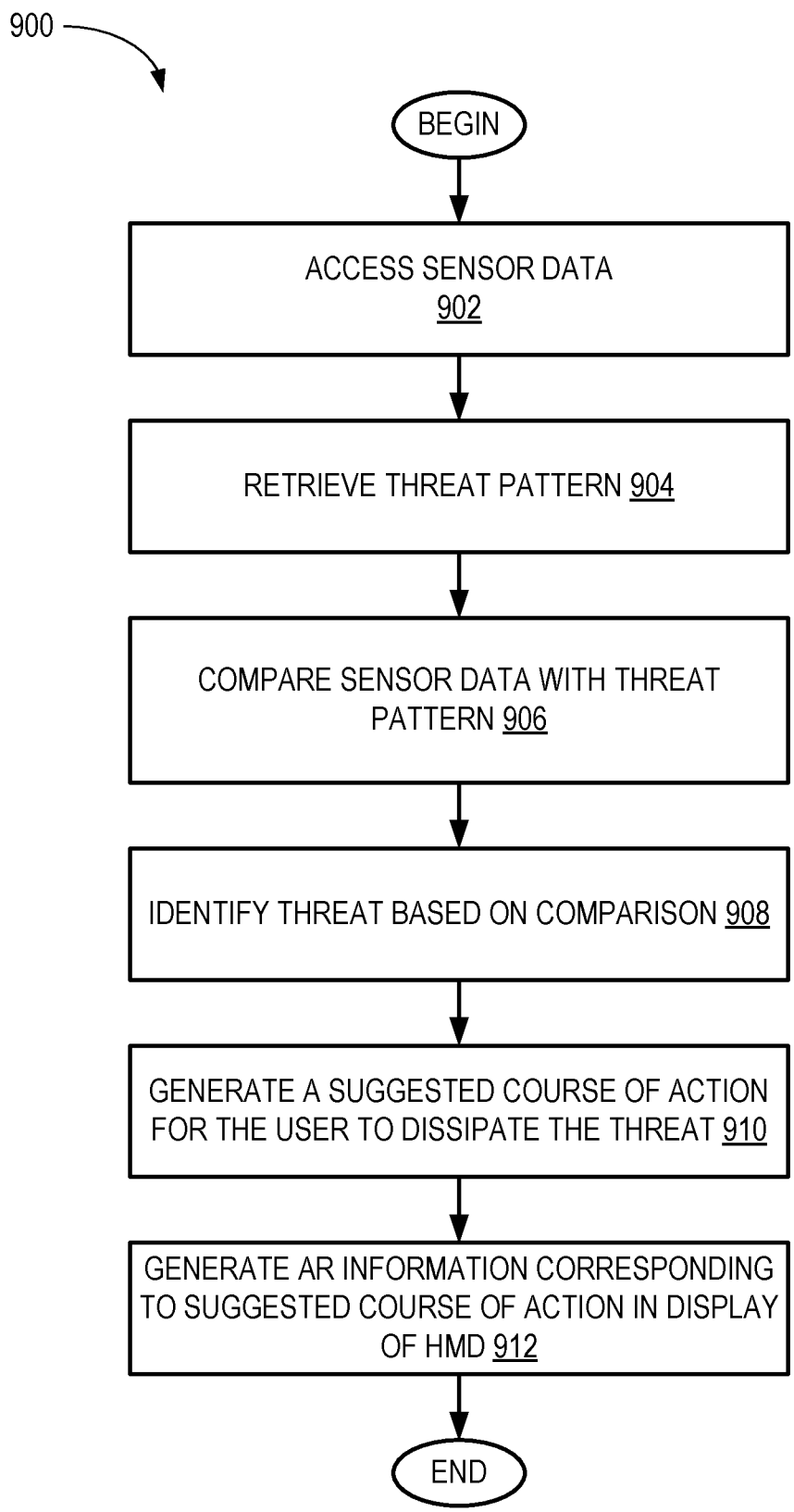
FIG. 9 is a flowchart illustrating a method for identifying a threat based on the threat pattern, according to another example embodiment.

FIG. 9 is a flowchart illustrating a method 900 for identifying a threat based on the threat pattern, according to another example embodiment. The method 900 may be deployed on the server 110 or on the HMD 101 and, accordingly, is described merely by way of example with reference thereto. At operation 902, the HMD 101 accesses sensor data. As previously described, the sensor data includes HMD-based sensor data, user-based sensor data, physical object-based sensor data, and ambient-based sensor data. Operation 902 may be implemented with the threat application 216 of HMD 101.

At operation 904, the HMD 101 retrieves the threat pattern locally from the storage device 208 of the HMD 101 or remotely from the threat pattern dataset 512 of the server 110. Operation 904 may be implemented with the threat identification module 404 in HMD 101.

At operation 906, the HMD 101 compares sensor data with the threat pattern to determine whether the sensor data matches or is outside safety ranges specified in the threat pattern, or falls within pre-specified safe ranges. Operation 906 may be implemented with the threat identification module 404 in HMD 101.

At operation 908, the HMD 101 identifies the threat based on the comparison. At operation 910, the HMD 101 generates a suggested course of action for the user 102 to take to address and dissipate the threat. At operation 912, the HMD 101 generates AR information corresponding to the suggested course of action and displays the AR information in the display 204 of the HMD 101.

Figure 10:
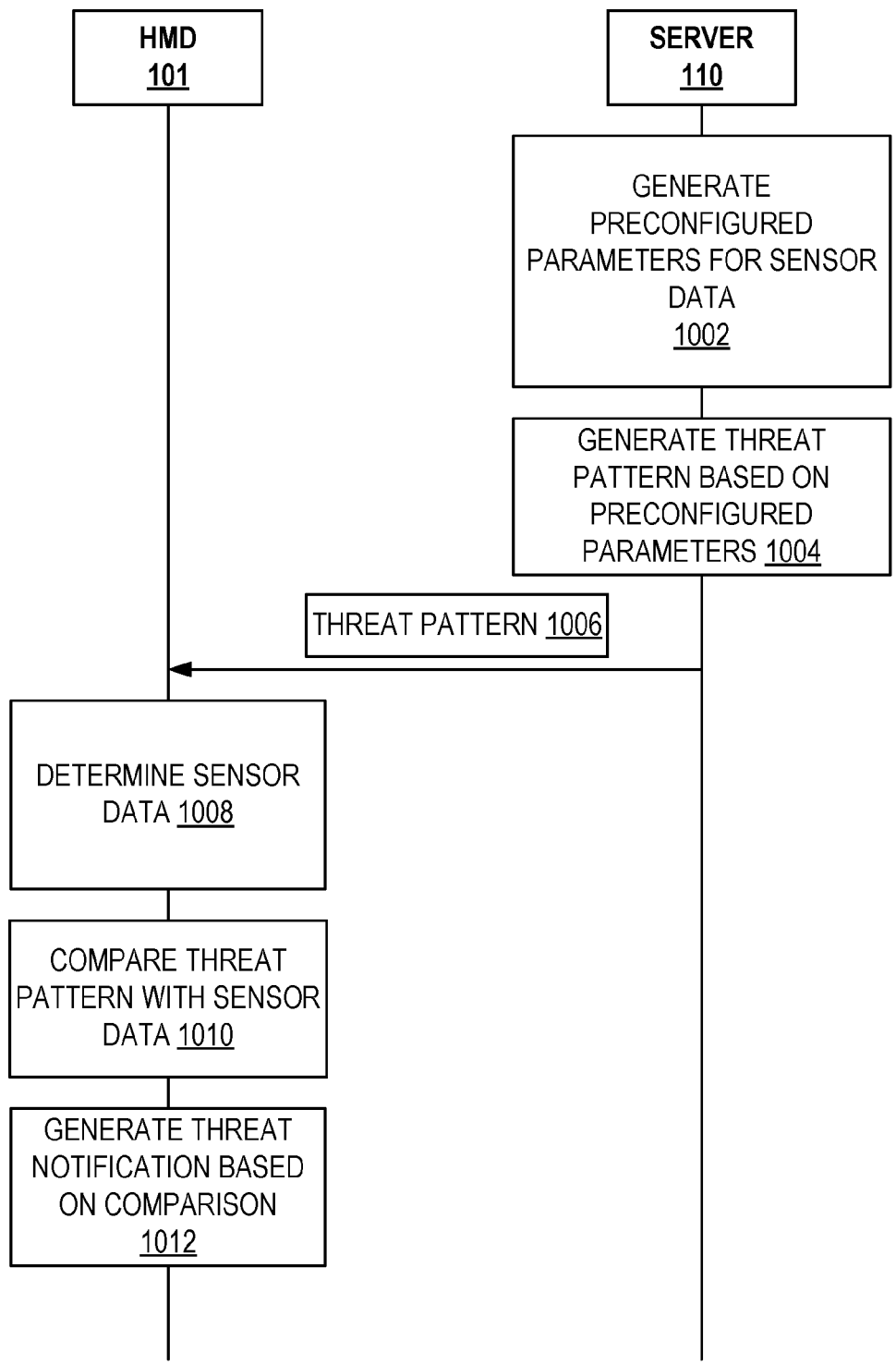
FIG. 10 is an interaction diagram illustrating interactions between a head mounted device and a server for generating a threat pattern based on preconfigured parameters, according to an example embodiment.

FIG. 10 is an interaction diagram illustrating interactions between a head mounted device 101 and a server 110 for generating a threat pattern based on preconfigured parameters, according to an example embodiment. At operation 1002, the server 110 generates preconfigured parameters for the sensor data related to the HMD 101. At operation 1004, the server 110 generates a threat pattern based on the preconfigured parameters generated in operation 1002. The server 110 communicates the threat pattern to the HMD 101 at operation 1006. At operation 1008, the HMD 101 generates sensor data using, for example, sensors 202. The HMD 101 then compares the sensor data with the threat pattern to identify a threat at operation 1010. At operation 1012, the HMD 101 generates a notification of the threat to the user 102 based on the comparison.

Figure 11:
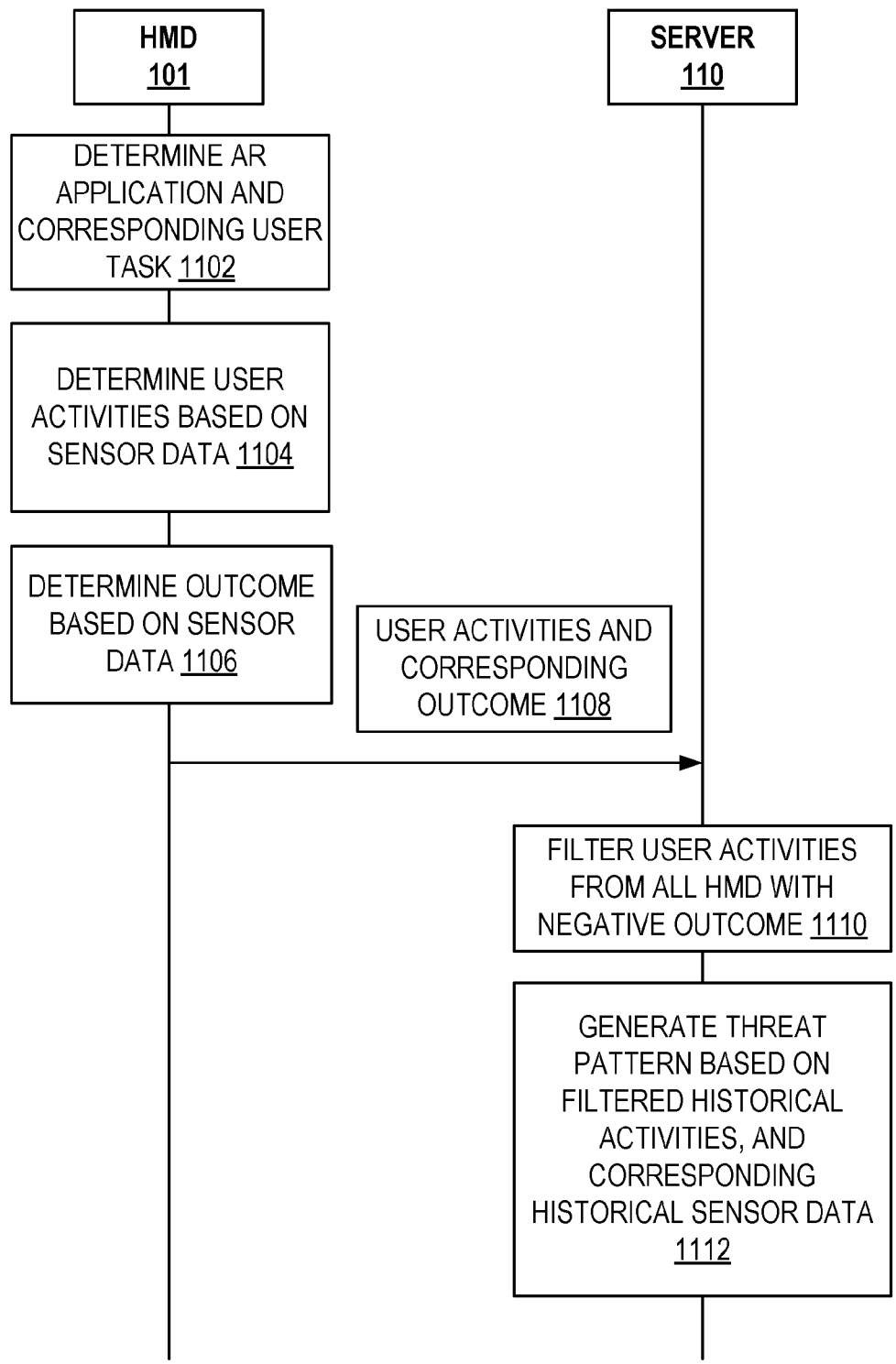
FIG. 11 is an interaction diagram illustrating interactions between a head mounted device and a server for generating a threat pattern based on historical activities, according to an example embodiment.

FIG. 11 is an interaction diagram illustrating interactions between a head mounted device 101 and a server 110 for generating a threat pattern based on historical activities, according to an example embodiment. At operation 1102, the HMD 101 determines the AR application 214 and the corresponding user task. At operation 1104, the HMD 101 determines user activities based on the sensor data to determine what actions have been performed on physical objects 116, 118. At operation 1106, the HMD 101 determines an outcome based on sensor data (e.g., engine overheats as a result of the user 102 flipping a switch). The HMD 101 communicates the user activities and the corresponding outcome to the server 110 at operation 1108. The server 110 filters the user activities from all HMDs that have resulted in negative outcome at operation 1110. The server 110 generates a threat pattern based on the filtered historical activities, and corresponding historical sensor data at operation 1112. In another example embodiment, the server 110 performs a statistical analysis on the user activities to determine the user 102's respective performance. The server 110 may use results from the statistical analysis to identify a threat (e.g., a user 102 took too long to turn a dial, as a result, an engine may overheat).

Figure 12:
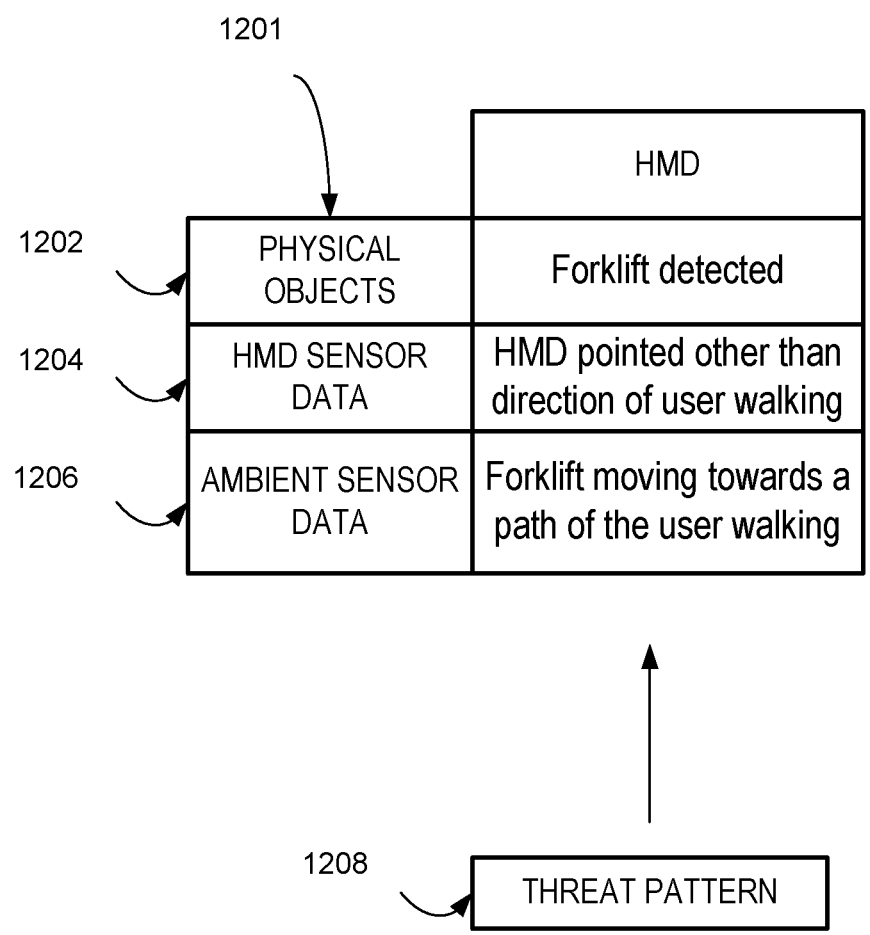
FIG. 12 is a block diagram illustrating an example of a threat pattern based on preconfigured parameters, according to an example embodiment.

FIG. 12 is a block diagram illustrating an example of a threat pattern 1208 based on preconfigured parameters 1201, according to an example embodiment. For example, the HMD 101 detects a physical object 1202 (e.g., forklift) in proximity to the HMD 101. The HMD-based sensor data 1204 may indicate that the user 102 is looking away from the direction the user 102 is walking. The ambient-based sensor data 1206 may indicate that the forklift is moving towards the user 102 or a projected walking path of the user 102.

Figure 13:
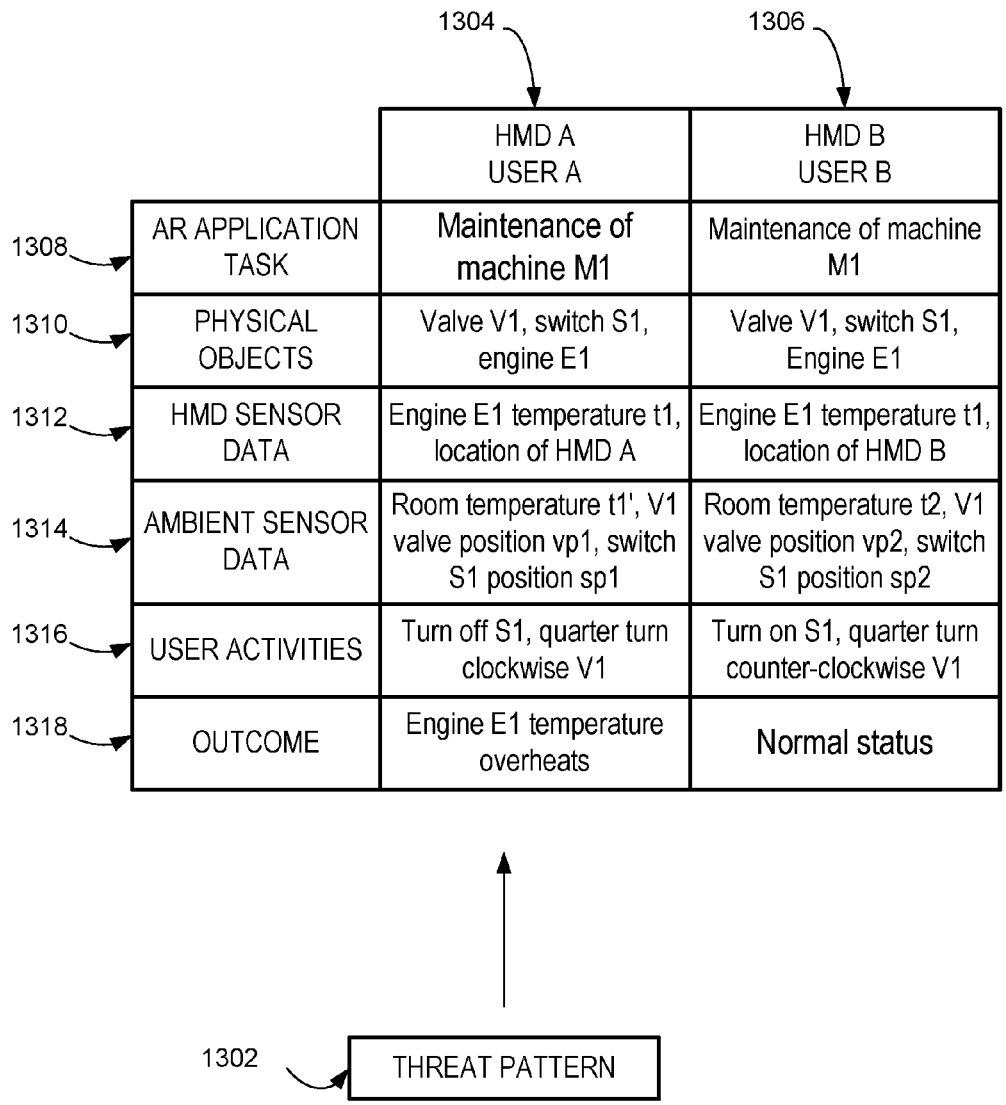
FIG. 13 is a block diagram illustrating an example of a threat pattern based on historical activities, according to an example embodiment.

FIG. 13 is a block diagram illustrating an example of a threat pattern 1302 based on historical activities, according to an example embodiment. Historical activities may include AR application task 1308, physical object identified 1310, HMD-based sensor data 1312, ambient-based sensor data 1314, user activities 1316, and outcome 1318. The historical activities for each user 102/HMD 101 1304, 1306 are accessed. The threat pattern 1302 is identified based on the historical activities having a negative outcome (e.g., engine E1 temperature overheats).

Figure 14A:
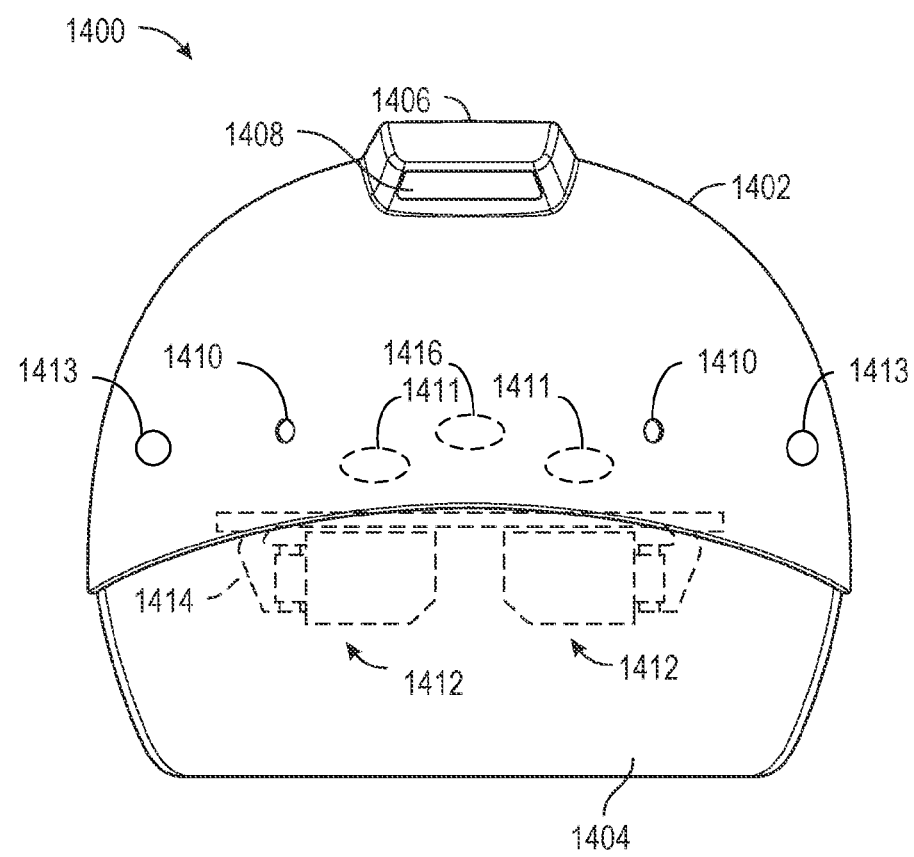
FIG. 14A is a block diagram illustrating a front view of a head mounted device, according to some example embodiments.
Figure 14B:
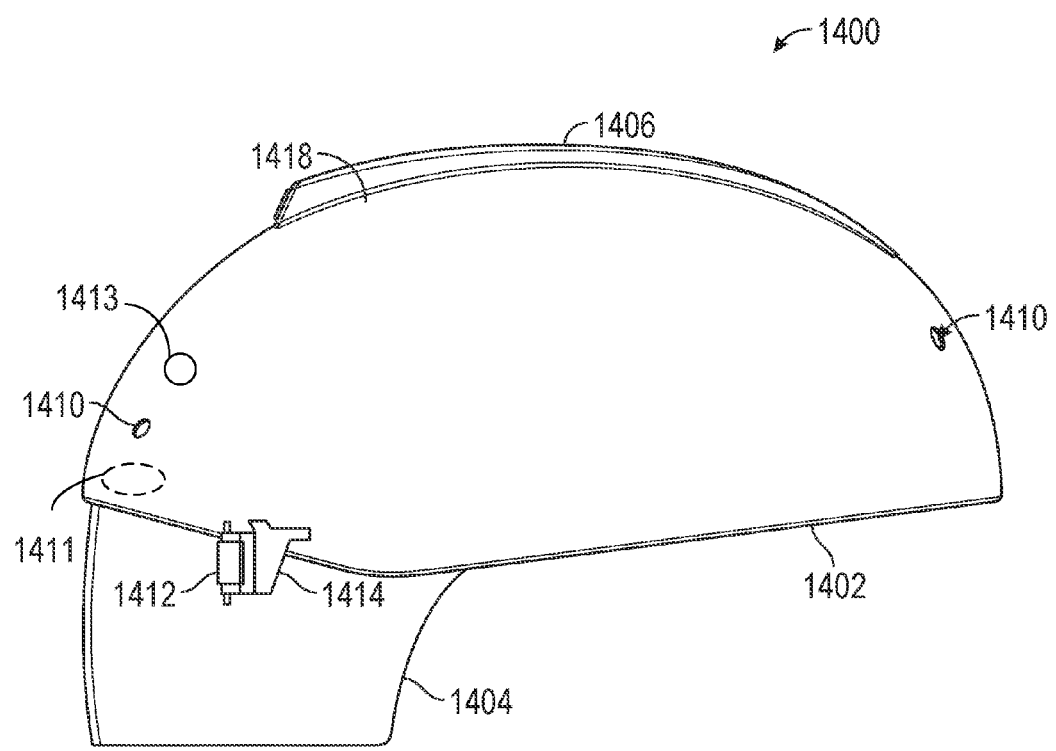
FIG. 14B is a block diagram illustrating a side view of the head mounted device of FIG. 14A.

FIG. 14A is a block diagram illustrating a front view of a head mounted device 1400, according to some example embodiments. FIG. 14B is a block diagram illustrating a side view of the head mounted device 1400 of FIG. 14A. The HMD 1400 includes a helmet 1402 with an attached visor 1404. The helmet 1402 may include sensors 202 (e.g., optical and audio sensors 1408 and 1410 provided at the front, back, and a top section 1406 of the helmet 1402). Display lenses 1412 are mounted on a lens frame 1414. The display lenses 1412 include the display 204 of FIG. 2. The helmet 1402 further includes ocular cameras 1411. Each ocular camera 1411 is directed to an eye of the user 102 to capture an image of the iris or retina. Each ocular camera 1411 may be positioned on the helmet 1402 above each eye and facing a corresponding eye. The helmet 1402 also includes EEG/ECG sensors 1416 to measure brain activity and heart rate pattern of the user 102.

In another example embodiment, the helmet 1402 also includes lighting elements in the form of LED lights 1413 on each side of the helmet 1402. An intensity or brightness of the LED lights 1413 is adjusted based on the dimensions of the pupils of the user 102. The threat application 216 may control lighting elements to adjust a size of the iris of the user 102. Therefore, the threat application 216 may capture an image of the iris at different sizes for different virtual objects.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor 212 or a group of processors 212) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 212 or other programmable processor 212) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 212 configured using software, the general-purpose processor 212 may be configured as respective different hardware modules at different times. Software may accordingly configure a processor 212, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors 212 that are temporarily configured (e.g., by software) or permanently configured to perform the relevant operations. Whether temporarily or permanently configured, such processors 212 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 212 or processor-implemented modules. The performance of certain of the operations may be distributed among the one or more processors 212, not only residing within a single machine, but deployed across a number of machines. In some example embodiments, the processor or processors 212 may be located in a single location (e.g., within a home environment, an office environment or as a server farm), while in other embodiments the processors 212 may be distributed across a number of locations.

The one or more processors 212 may also operate to support performance of the relevant operations in a "cloud computing" environment or as a "software as a service" (SaaS). For example, at least some of the operations may be performed by a group of computers (as examples of machines including processors 212), these operations being accessible via a network 108 and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 212, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network 108.

In example embodiments, operations may be performed by one or more programmable processors 212 executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers 110. A client and server 110 are generally remote from each other and typically interact through a communication network 108. The relationship of client and server 110 arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 212), or a combination of permanently and temporarily configured hardware may be a design choice. Below are set out hardware (e.g., machine) and software architectures that may be deployed, in various example embodiments.

Example Machine Architecture

Figure 15:
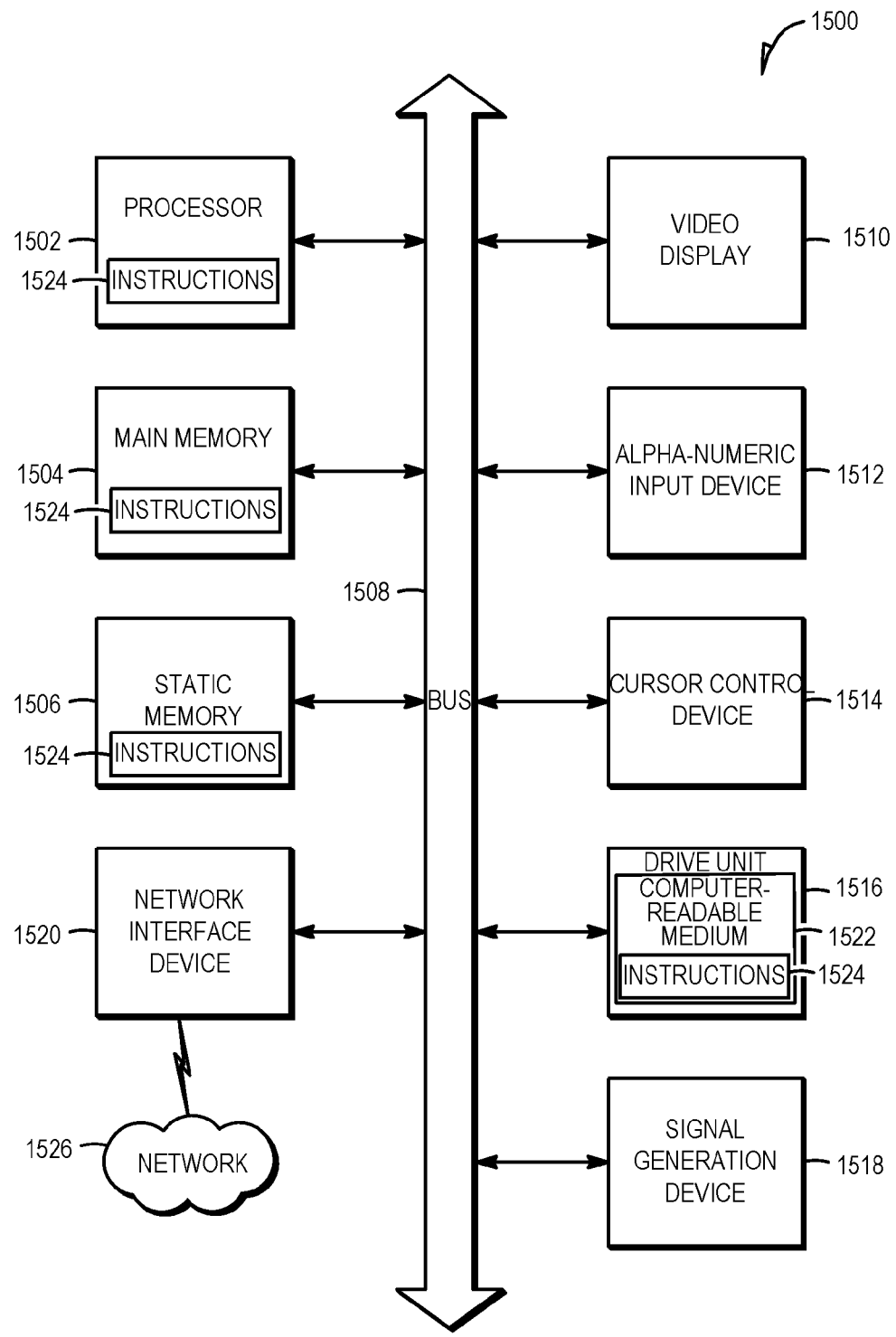
FIG. 15 is a block diagram illustrating components of a machine, according to some example embodiments, able to read instructions from a machine-readable medium and perform any one or more of the methodologies discussed herein.

FIG. 15 is a block diagram of a machine in the example form of a computer system 1500 within which instructions 1524 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server 110 or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions 1524 (sequential or otherwise) that specify actions to be taken by that machine. Further, while only a single machine is illustrated, the term "machine" shall also be taken to include any collection of machines that individually or jointly execute a set (or multiple sets) of instructions 1524 to perform any one or more of the methodologies discussed herein.

The example computer system 1500 includes a processor 1502 (e.g., a central processing unit (CPU), a graphics processing unit (GPU) or both), a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a user interface (UI) navigation (or cursor control) device 1514 (e.g., a mouse), a disk drive unit 1516, a signal generation device 1518 (e.g., a speaker) and a network interface device 1520.

Machine-Readable Medium

The disk drive unit 1516 includes a machine-readable medium 1522 on which is stored one or more sets of data structures and instructions 1524 (e.g., software) embodying or utilized by any one or more of the methodologies or functions described herein. The instructions 1524 may also reside, completely or at least partially, within the main memory 1504 and/or within the processor 1502 during execution thereof by the computer system 1500, the main memory 1504 and the processor 1502 also constituting machine-readable media 1522. The instructions 1524 may also reside, completely or at least partially, within the static memory 1506.

While the machine-readable medium 1522 is shown, in an example embodiment, to be a single medium, the term "machine-readable medium" may include a single medium or multiple media (e.g., a centralized or distributed database, and/or associated caches and servers 110) that store the one or more instructions 1524 or data structures. The term "machine-readable medium" shall also be taken to include any tangible medium that is capable of storing, encoding or carrying instructions 1524 for execution by the machine and that cause the machine to perform any one or more of the methodologies of the present embodiments, or that is capable of storing, encoding or carrying data structures utilized by or associated with such instructions 1524. The term "machine-readable medium" shall accordingly be taken to include, but not be limited to, solid-state memories, and optical and magnetic media. Specific examples of machine-readable media 1522 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1524 may further be transmitted or received over a communications network 1526 using a transmission medium. The instructions 1524 may be transmitted using the network interface device 1520 and any one of a number of well-known transfer protocols (e.g., HTTP). Examples of communication networks 1526 include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions 1524 for execution by the machine, and includes digital or analog communications signals or other intangible media to facilitate communication of such software.

Although an embodiment has been described with reference to specific example embodiments, it will be evident that various modifications and changes may be made to these embodiments without departing from the scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A head mounted device (HMD) comprising:
a transparent display;
a plurality of sensors configured to measure sensor data; and
a processor comprising an augmented reality (AR) application and a threat application,
the threat application being configured to identify a threat condition based on a threat pattern and the sensor data, and to generate a warning notification in response to the identified threat condition, the threat pattern comprising preconfigured thresholds for the sensor data,
the threat application comprising a threat learning module being configured to access historical sensor data corresponding to user tasks, to identify user tasks with a negative outcome, to filter historical sensor data resulting in the negative outcome from the historical sensor data, and to generate the threat pattern based on the filtered historical sensor data; and
the AR application being configured to cause a display of AR content comprising the warning notification in the transparent display.

2. The HMD of claim 1, wherein the threat application comprises:
  the threat learning module configured to receive the threat pattern from a server, the server configured to generate the preconfigured thresholds for the sensor data; and
  a threat identification module configured to identify one of the sensor data transgressing one of the preconfigured thresholds, and to generate correction information based on the identified sensor data exceeding one of the preconfigured thresholds, the correction information including instructions to address the threat condition.

3. The HMD of claim 2, wherein the AR content includes the correction information, the correction information including instructions to a user of the HMD and a three-dimensional model including the correction information.

4. The HMD of claim 1, wherein the threat learning module is configured to identify the negative outcome based on preconfigured parameters for the sensor data.

5. The HMD of claim 1, wherein the plurality of sensors includes:
  a first set of sensors configured to generate HMD-based sensor data related to the HMD; and
  a second set of sensors configured to generate ambient-based sensor data related to an ambient environment of the HMD, the ambient environment including a physical space within a predefined distance of the HMD,
  the sensor data comprising the HMD-based sensor data and the ambient-based sensor data.

6. The HMD of claim 5, wherein the threat pattern is generated based on preconfigured parameters for the HMD-based sensor data and the ambient-based sensor data.

7. The HMD of claim 5,
  wherein the threat learning module is configured to identify a task provided by the AR application, a physical object associated with the task, historical HMD-based sensor data associated with the task and the physical object, historical ambient-based sensor data associated with the task and the physical object, historical user activities associated with the task, and an outcome of the historical user activities,
  wherein the threat learning module is configured to generate the threat pattern based on a negative outcome of the historical user activities, the negative outcome being determined in response to the historical HMD-based sensor data or historical ambient-based sensor data transgressing a predefined threshold,
  the threat pattern comprising a series of user activities with respect to the physical object, a series of HMD-based sensor data corresponding to the series of user activities, and a series of historical ambient-based sensor data corresponding to the series of user activities.

8. The HMD of claim 5, wherein the threat application is configured to receive further ambient-based sensor data from a third set of sensors external to the HMD,
  the threat pattern comprising a series of historical ambient-based sensor data from the third set of sensors.

9. The HMD of claim 1, wherein the AR application is configured to determine a travel direction of the HMD based on at least one of the plurality of sensors, to determine that the travel direction is outside a field of view of a user of the HMD, to identify a moving physical object outside a field of view of the user of the HMD, to determine a trajectory of the moving physical object based on a travel path of the moving physical object, to determine that the trajectory of the moving physical object intersects the travel direction of the HMD at an estimated intersection located within a threshold distance of the HMD, and to generate the warning notification based on the estimated intersection.

10. A method comprising:
  measuring sensor data using a plurality of sensors in a head-mounted device (HMD);
  identifying a threat condition based on a comparison of a threat pattern with the sensor data, the threat pattern comprising preconfigured thresholds for the sensor data;
  accessing historical sensor data corresponding to user tasks;
  identifying user tasks with a negative outcome;
  filtering historical sensor data resulting in the negative outcome from the historical sensor data, the threat pattern generated based on the filtered historical sensor data;
  generating the threat pattern based on the filtered historical sensor data;
  generating a warning notification in response to the identified threat condition; and
  displaying, using a hardware processor of the HMD, AR content including the warning notification in a transparent display of the HMD.

11. The method of claim 10, further comprising:
  receiving the threat pattern from a server, the server configured to generate the preconfigured thresholds for the sensor data; and
  identifying one of the sensor data transgressing one of the preconfigured thresholds; and
  generating correction information based on the identified sensor data exceeding one of the preconfigured thresholds, the correction information including instructions to address the threat condition.

12. The method of claim 11, wherein the AR content includes the correction information, the correction information including instructions to a user of the HMD and a three-dimensional model including the correction information.

13. The method of claim 10, further comprising:
  identifying the negative outcome based on preconfigured parameters for the sensor data.

14. The method of claim 10, wherein the plurality of sensors includes:
  a first set of sensors being configured to generate HMD-based sensor data related to the HMD; and
  a second set of sensors being configured to generate ambient-based sensor data related to an ambient environment of the HMD, the ambient environment including a physical space within a predefined distance of the HMD,
  the sensor data comprising the HMD-based sensor data and the ambient-based sensor data.

15. The method of claim 14, wherein the threat pattern is generated based on preconfigured parameters for the HMD-based sensor data and the ambient-based sensor data.

16. The method of claim 14, further comprising:
  identifying a task provided by an AR application, a physical object associated with the task, historical HMD-based sensor data associated with the task and the physical object, historical ambient-based sensor data associated with the task and the physical object, historical user activities associated with the task, and an outcome of the historical user activities;
  generating the threat pattern based on a negative outcome of the historical user activities, the negative outcome being determined in response to the historical HMD-based sensor data or historical ambient-based sensor data transgressing a predefined threshold, the threat pattern comprising a series of user activities with respect to the physical object, a series of HMD-based sensor data corresponding to the series of user activities, and a series of historical ambient-based sensor data corresponding to the series of user activities.

17. The method of claim 10, further comprising:

determining a travel direction of the HMD based on at least one of the plurality of sensors;

determining that the travel direction is outside a field of view of a user of the HMD;

identifying a moving physical object outside a field of view of the user of the HMD;

determining a trajectory of the moving physical object based on a travel path of the moving physical object;

determining that the trajectory of the moving physical object intersects the travel direction of the HMD at an estimated intersection located within a threshold distance of the HMD; and generating the warning notification based on the estimated intersection.

18. A non-transitory machine-readable medium comprising instructions that, when executed by one or more processors of a machine, cause the machine to perform operations comprising:

measuring sensor data using a plurality of sensors in a head-mounted device (HMD);

identifying a threat condition based on a comparison of a threat pattern with the sensor data, the threat pattern comprising preconfigured thresholds for the sensor data;

accessing historical sensor data corresponding to user tasks;

identifying user tasks with a negative outcome;

filtering historical sensor data resulting in the negative outcome from the historical sensor data, the threat pattern generated based on the filtered historical sensor data;

generating the threat pattern based on the filtered historical sensor data;

generating a warning notification in response to the identified threat condition; and displaying, using a hardware processor of the HMD, AR content including the warning notification in a transparent display of the HMD.

* * * * *